(12) United States Patent
Sears et al.

(10) Patent No.: US 10,163,307 B1
(45) Date of Patent: *Dec. 25, 2018

(54) ITEM DEPOSITORY APPARATUS OPERATED RESPONSIVE TO DATA BEARING RECORDS

(71) Applicant: Nautilus Hyosung America, Inc., Irving, TX (US)

(72) Inventors: Michael Leigh Sears, Lewisville, TX (US); Joseph Militello, Miamisburg, OH (US)

(73) Assignee: NAUTILUS HYOSUNG AMERICA, INC., Irving, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/784,511

(22) Filed: Oct. 16, 2017

Related U.S. Application Data

(63) Continuation of application No. 14/987,888, filed on Jan. 5, 2016, now Pat. No. 9,792,781.

(60) Provisional application No. 62/100,505, filed on Jan. 7, 2015.

(51) Int. Cl.
  *G07F 19/00* (2006.01)
  *G07D 7/121* (2016.01)
  *G07B 17/00* (2006.01)

(52) U.S. Cl.
  CPC .......... *G07F 19/202* (2013.01); *G07D 7/121* (2013.01); *G07B 2017/00717* (2013.01)

(58) Field of Classification Search
  CPC .................. G07F 19/202; G07D 7/121; G07B 2017/00717
  See application file for complete search history.

(56) References Cited

U.S. PATENT DOCUMENTS 6,583,813 B1 * 6/2003 Enright .................. G06Q 20/18
                                                 348/143
9,004,352 B1 * 4/2015 Graef ................ G07D 11/0096
                                                 235/379

* cited by examiner

*Primary Examiner* — Sonji Johnson
(74) *Attorney, Agent, or Firm* — Ralph E. Jocke; Walker & Jocke

(57) ABSTRACT

A depository system operates in response to data bearing records. Information regarding planned future deposits is recorded, at least one record visible appearance feature is stored or generated, and data corresponding to the at least one record appearance feature is stored in associated relation with deposit data. The at least one record appearance feature is made visible on a deposit item. The deposit item is subsequently presented to a depository that includes an image sensor. The image sensor operates to read the at least one record appearance feature. At least one controller in the depository causes a determination to be made that at least one record appearance feature corresponds to a pre-registered deposit and such determination enables the deposit item to be received in the depository.

20 Claims, 14 Drawing Sheets

ITEM DEPOSITORY APPARATUS OPERATED RESPONSIVE TO DATA BEARING RECORDS

CROSS REFERENCE TO RELATED APPLICATION

This application is a continuation of application Ser. No. 14/987,888 filed Jan. 5, 2016, which application claims benefit pursuant to 35 U.S.C. § 119(e) of Provisional Application Ser. No. 62/100,505 filed Jan. 7, 2015, the disclosures of each of which applications are incorporated herein by reference in its entirety.

TECHNICAL FIELD

This invention relates to a depository apparatus that operates to accept and record the receipt of deposit items in response to data bearing records, which may be classified in U.S. Class CPC G07F 19/202; USPC 235/379.

BACKGROUND

Depositories that operate to accept deposit items from users have been implemented in a number of business environments. One such environment includes the acceptance of items related to financial transactions during time periods when an establishment is not otherwise staffed or open for business. Utility companies, governmental agencies and financial institutions sometimes provide depositories so that deposit items can be accepted from customers on an around-the-clock basis.

Commonly, such depositories receive deposit items that include a bag, envelope or other enclosure item. Once the item has been received in the depository, the deposit item must be opened and its contents examined. Examination is done to verify the contents and to properly credit the person or entity who is responsible for making the deposit. This process of verifying the contents associated with a deposit item and determining the account information with which the deposit item is associated can be time consuming. Further, the requirement to verify the deposit contents extends the time between when the deposit item is deposited and the customer is credited for having made the deposit.

Various endeavors have been made to improve depositories and the processes for receiving deposit items therein. However, depository systems may benefit from improvements.

SUMMARY

The exemplary arrangements described herein relate to a depository that operates to accept deposit items responsive to correspondence between data bearing records and pre-recorded deposit data. The exemplary apparatus includes a depository with a depository head which includes a movable drum portion. The depository further includes a secure safe portion. The drum portion is enabled to be moved by authorized users to an open position in which the drum can accept the deposit item therein. The user can then move the drum to the closed position in which the deposit item placed in connection with the drum disengages from the drum and travels into the interior area of the safe.

In the exemplary arrangement the ability of a user of the depository to move the drum to accept the deposit is controlled by a lock member. The lock member is movable between locked and unlocked positions. An electromagnetic actuator is in operative connection with the lock member and is configured to selectively cause the lock member to be positioned in the locked and unlocked positions. In the exemplary arrangement, an actuator module is in operative connection with the electromagnetic actuator. The actuator module is in operative connection with a power source that can drive the electromagnetic actuator. The exemplary actuator module also includes control circuitry including anti-reverse current circuitry which serves to minimize the risk of damage to components which communicate with the actuator module.

The exemplary arrangement includes a control panel which is externally mounted in operative connection with the depository. The control panel in some arrangements is a retrofit panel which can be installed on existing depository structures. The control panel includes an image sensor.

The exemplary arrangement includes at least one controller. The controller includes at least one microprocessor and data store. The controller is in operative connection with the image sensor and the actuator module. The exemplary controller operates to cause the image sensor to capture at least one image of an appearance feature that is on or associated with a deposit item. The exemplary controller operates to generate appearance data which corresponds to the at least one appearance feature.

The exemplary controller operates to cause a determination to be made that the appearance data corresponds to a previously registered deposit that has been authorized to be accepted by the depository. In exemplary arrangements this pre-registered deposit may be requested by a merchant or other entity, who has requested through a remote computer device the capability to make a deposit into the depository. In such arrangements the requesting entity may operate a user computer to indicate to a remote server associated with a financial institution or other entity that operates the depository, the entity's identifying information such as account data. The entity wishing to make the deposit may also indicate to the server other information concerning the nature of the deposit items including the number and/or type of bills, checks, coin or other information that describes the type and/or value associated with the contents of the planned deposit item.

In response to verifying that the requesting entity is authorized to make such a deposit such as by verifying that the entity has an account which can be credited for the value associated with the deposit items, the remote server can authorize the deposit. Such authorizations may include providing to the user computer, data which can be used to produce visual indicia having at least one appearance feature on a printer associated with the user computer. The visual indicia may be produced by the printer on paper or a label. The user may then apply such a label or the paper on or in the deposit item. For example the deposit item may include at least one clear side, such that the visual indicia produced which has the at least one appearance feature that identifies the deposit, can be captured by the image sensor. Alternatively in other arrangements the user computer may operate to capture an image one or more items to be included in the deposit. The one or more items may be visible through a clear side of the deposit item which enables the identification thereof.

In the exemplary arrangement when the controller sends the appearance data captured from the deposit item to the remote server, the determination is made that the image data corresponds to a particular pre-registered deposit. In response to this determination, the remote server sends one or more reply messages to the controller. The controller then operates to cause the electromagnetic actuator to be actuated to enable movement by the user of the drum of the depository head.

The user moves the drum to expose a pocket in the depository head and places the deposit item therein after the appearance feature thereon has been read by the image sensor. The user then moves the drum to the closed position and the deposit item falls by gravity or otherwise is moved into the interior area of the secure safe of the depository. In the exemplary arrangement at least one drum sensor is operative to sense the position of the head, and at least one deposit sensor is operative to sense a deposit item that has moved from the pocket toward the safe.

In the exemplary arrangement the deposit sensor is in operative connection with the controller. Sensing the deposit item with the deposit sensor causes the controller to operate to generate at least one deposit signal. In the exemplary arrangement the deposit signal causes the controller to cause one or more messages to be sent to the remote server to indicate receipt of the previously identified deposit item. In this manner, the remote server is notified that the registered deposit item has been received in the depository.

In exemplary arrangements receipt of the deposit item causes the remote server to operate to record data corresponding to the receipt of the deposit and to cause the value associated with the pre-registered deposit to be credited to the account of the entity associated with the deposit. This can be done directly through operation of the server which holds the pre-registered depository data or alternatively this may be done through communications with other remote computers or servers associated with the financial institution or other entity that provides credit for the deposit received.

Numerous other features and arrangements may be used in exemplary embodiments to provide reliable, cost effective depository capabilities.

DETAILED DESCRIPTION

Figure 1:
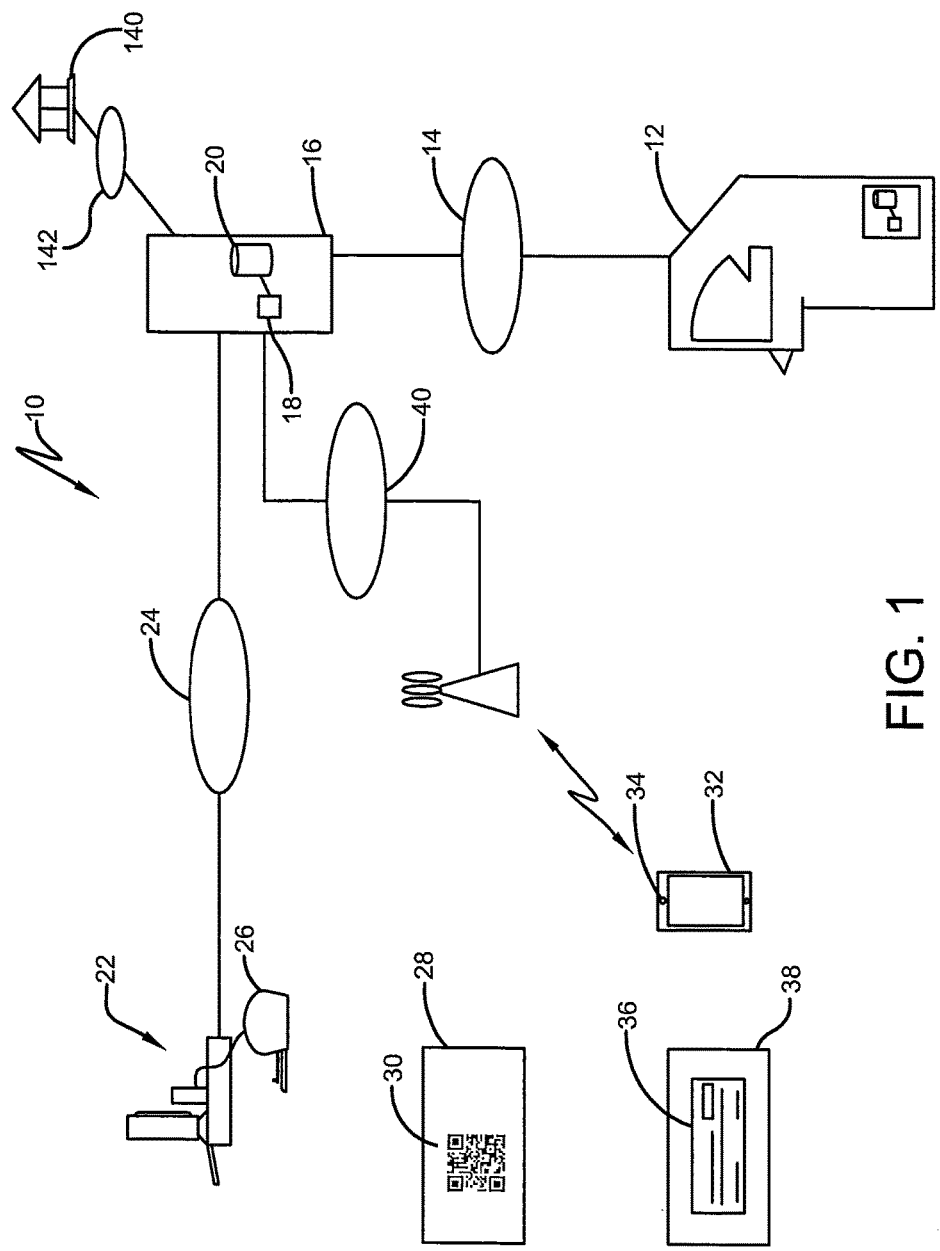
FIG. 1 is a schematic view showing a system which includes an exemplary depository that operates to accept deposit items in response to data bearing records.

Referring now to the drawings and particularly to FIG. 1, there is shown therein schematically an exemplary system 10. System 10 includes a depository 12. Depository 12 of the exemplary arrangement operates to receive deposit items corresponding to deposits that have been pre-registered in the system. It should be understood that exemplary embodiments may include a plurality of depositories, each of which may operate to accept deposit items in a manner like that described herein.

The exemplary depository is connected in a wired or wireless manner to one or more networks 14. At least one remote server 16 is in operative connection with the network 14. It should be understood that remote server 16 may represent a single server or a plurality of interconnected servers or other types of computers. Each of the servers 16 includes one or more processors schematically indicated 18. The processors are in operative connection with one or more data stores schematically indicated 20. In the exemplary arrangement shown, the remote server 16 is associated with a financial institution whose customers are enabled to pre-register deposits to accounts through operation of the server. It should be understood that in other exemplary arrangements, such servers may be associated with other types of entities that accept deposits. Such entities may include, for example, utilities that accept the deposit of payments from their customers for utility services that are provided. In other arrangements, the remote server 16 may be associated with municipal or other governmental authorities that accept payments for public services, taxes or similar items from customers. In other arrangements, the one or more servers may be associated with entities that accept payments for goods or services. Alternatively the server may be associated with entities that accept donations. The servers and systems features of the type schematically represented in FIG. 10 may be used in numerous different deposit accepting environments.

In the exemplary system, customers of the financial institution are enabled to pre-register deposits that they wish to make into their accounts through unattended depositories. This may be done, for example, by account holder customers operating their computer devices to communicate with the remote server 16. A customer's personal computer device 22 is schematically represented in FIG. 1. In the exemplary arrangement the customer is enabled to operate their personal computer 22 to communicate with server 16. This is done through one or more public or private networks 24. In exemplary arrangement the communications may be conducted over a public network such as the Internet. In such circumstances, the messages may be encrypted and/or communicated through a virtual private network or other secure tunnel so as to reduce the risk of interception.

In an exemplary arrangement the customer may operate their computer 22 to communicate with the server 16 to identify the entity wishing to make the deposit and/or the entity's associated account data. Generally the user provides identifying data to the server which verifies the authority of the entity associated with the provided information, to pre-register deposits in the system. Suitable passwords, electronic credentials, certificates or other authenticating data may be exchanged between the user computer and the server to authenticate the user and/or the computer and the server.

In the exemplary arrangement if the user is authorized to pre-register a deposit, the user will then receive messages from the server asking them to indicate the contents of a deposit item that they will eventually be depositing in a depository connected to the system. In response to receiving this request, the user inputs through the input devices of their user computer, requested information. Such information may include the amount of cash included, the numbers and types of denominations of currency bills, the number, amounts and total of checks, vouchers, coin or other items that are to be included as part of the deposit. The remote server receives this information from the user and stores the information regarding the contents of the planned deposit item in association with the customer and/or account identifying data.

In the exemplary arrangement once the user has completed providing the information to the remote server concerning the content of the planned deposit, the remote server operates in accordance with its programming to send messages to the user computer 22 which include data that can be used to identify the particular deposit. In the exemplary arrangement the user's computer is provided with data which corresponds to visible indicia which includes at least one appearance feature which can be attached to or included with a deposit item. In exemplary arrangements, such an appearance feature may include a one or two-dimensional bar code such as a QR code, graphic identifying features or other features that can be read on or from a deposit item via an automated image scanner and which can be used to identify the deposit item. In exemplary arrangements, a record including the at least one appearance feature associated with the deposit can be printed by a user using a printer 26. The printer can be used to print the record on paper, on a sticker, on a label or other printable media.

The deposit identifying appearance feature printed or otherwise received by the user can be associated with the container which comprises the deposit item. In the exemplary embodiment the deposit item includes an envelope, box or bag such as represented by deposit item 28. In this exemplary arrangement the deposit item includes a bag having at least one clear plastic side. The clear plastic side may bound the main compartment for holding items within the bag. Alternatively the clear plastic side may bound a pocket which is a subcompartment on the side of the bag. The paper, sticker, label or other item may be placed in a position within the bag so that the bar code or other identifying feature is visible through the clear plastic side as represented by the identifying two-dimensional bar code 30 shown in FIG. 1. In the exemplary system, deposit items include bags made of reasonably tough and durable material so as to avoid tearing during the deposit and subsequent handling process. Further, such deposit bags may include an open side that is closed by a zipper or other suitable closure member that maintains the contents sealed within the deposit bag during the deposit and handling process, but which can be readily opened to remove the contents and enabling the bag to be reused. Of course it should be understood that this structure for the containers which comprise the deposit items is exemplary and in other embodiments, other approaches may be used. Such other approaches may include one time use envelopes, sacks, rigid boxes or other suitable types of containers on which deposit identifying appearance features can be read.

In some exemplary arrangements provisions may also be made for depositors to pre-register deposit items using a mobile device such as the mobile device smart phone schematically indicated 32. In exemplary arrangements the mobile device includes a camera 34. Camera 34 may be used to capture an image associated with a deposit item. For example the camera may be used to capture an image of a one or two-dimensional bar code or other visible feature that is printed or otherwise applied onto a deposit item. In some arrangements the appearance feature may be a permanent identifying number and/or other indicia which identifies the particular enclosure. In other arrangements, the imaged feature may include preprinted stickers, labels or other similar items that can be applied to or included on a deposit item. In still other arrangements, the camera of the mobile device may be used to capture an image of a face of a check, bill, deposit ticket or other item which is part of the particular deposit. In some exemplary arrangements, such an item may be at the top of a stack of items included in the deposit such that the item can be viewed and imaged through a transparent wall bounding the deposit bag. Such a check 36 is represented and shown included with the contents of the deposit item 38.

In the exemplary arrangement the mobile device is operative to wirelessly send the image data corresponding to the item that will be associated with the pre-registered deposit through a wireless network and/or other network schematically indicated 40. The mobile wireless device of the exemplary arrangement is enabled to communicate with the one or more servers 16. The user of the mobile wireless device is enabled to communicate the contents and value that will be associated with the particular deposit item 38 in a manner similar to that done by a user at computer 22. However, in this exemplary approach the image data associated with the selected visible deposit item, in this case check 36, is stored through operation of the at least one server as having the at least one appearance feature that is associated with the particular deposit. As a result, this arrangement enables a user who does not have a computer device that includes a printer can nonetheless pre-register a deposit which can be made into a depository connected in the system. Of course it should be understood that this particular approach is exemplary and in other arrangements, other approaches may be used.

Figure 2:
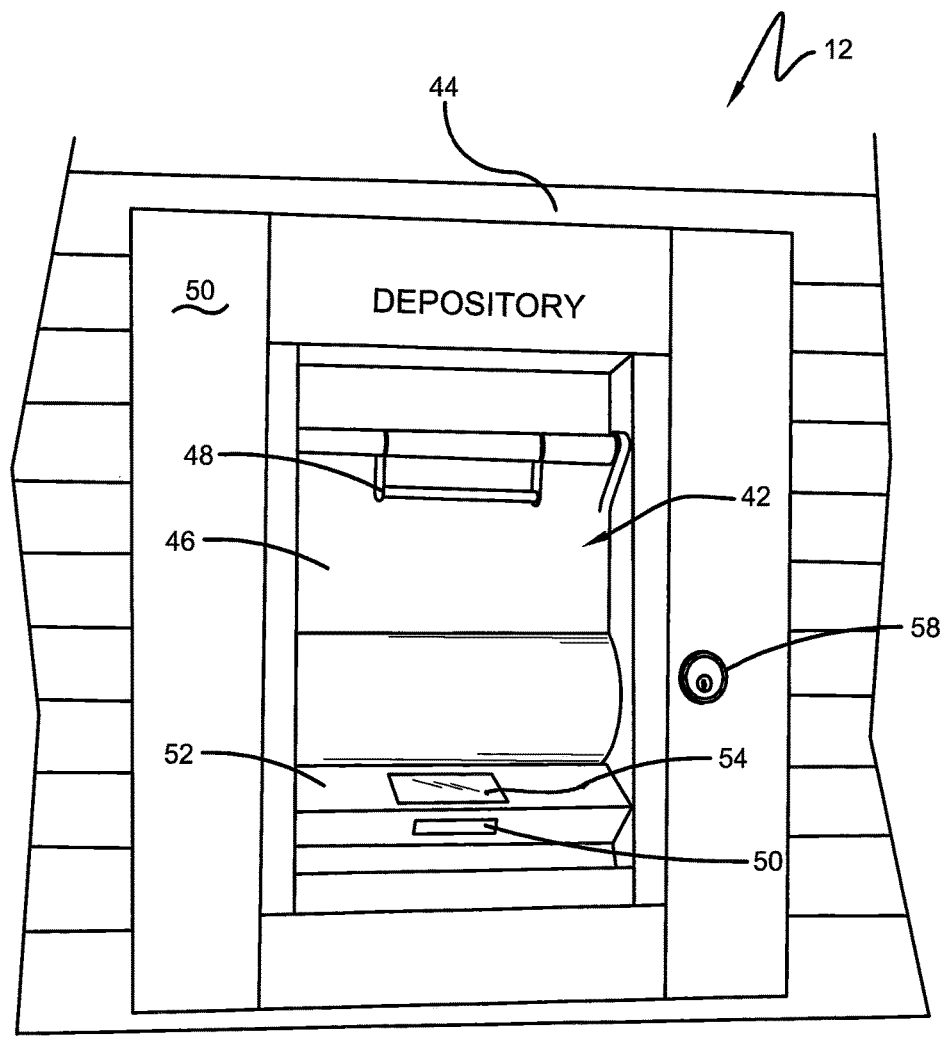
FIG. 2 is an isometric view of an exemplary depository.
Figure 3:
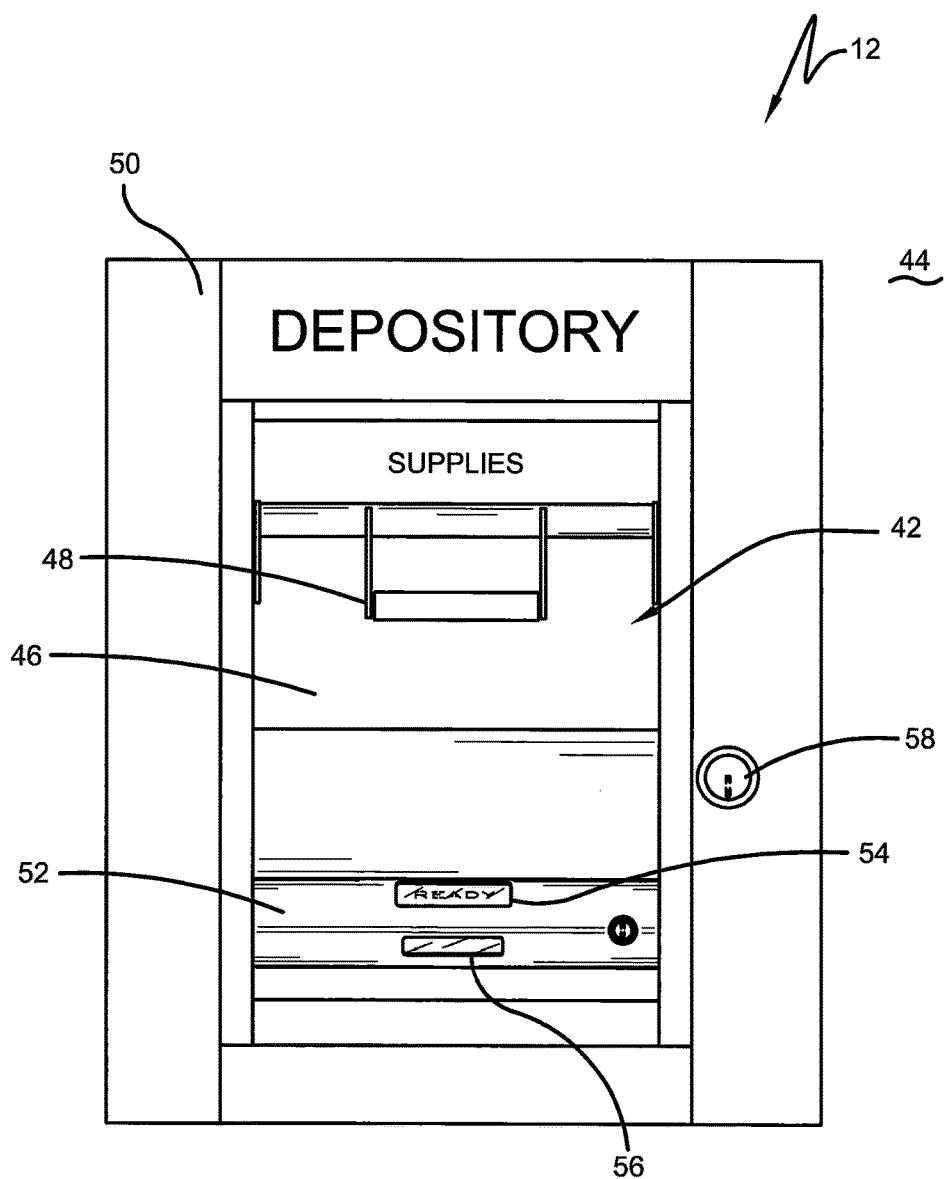
FIG. 3 is a front plan view of the exemplary depository shown in FIG. 2.

FIGS. 2 and 3 show an exterior area of an exemplary depository 12 that may be used in the manner described herein. The exemplary depository 12 has a depository head 42 which extends through a wall or other structure 44. The depository head 42 includes a rotatable drum 46 which is rotatably movable by a user through manual engagement of a handle 48. Although in the exemplary arrangement the drum is described as a rotatable structure that is rotatable within a head enclosure, drums in other arrangements may not be rotatable but comprise other structures that are relatively movable to receive a deposit item from a user in operative engagement therewith, and to then move or otherwise change condition so as to cause the deposit item to be placed within a secure safe or other container area.

In the exemplary depository 12, the drum and other external facing portion of the depository outside the wall is surrounded by a fascia 50. The fascia 50 of exemplary embodiments may include appropriate signage for instructing a user on the operation of the depository. Alternatively or in addition, the fascia or surrounding structures may include external lighting or other features that facilitate the use of the depository by the individuals who make deposits.

In the exemplary depository arrangement, the depository has an externally accessible control panel. The exemplary control panel is configured as a retrofit panel that can be installed on pre-existing depository structures in the manner like that later discussed. Alternatively or in addition, the control panel of exemplary arrangements may be integrated and installed with a new depository structure. Each type of panel will be referred to herein as a panel. Further while the exemplary control panel is shown as installed underneath the depository drum in the exemplary arrangements, numerous different positions for the control panel may be employed in various embodiments. Alternative embodiments may include multiple structures which include the components of and/or which perform the functions provided by the exemplary control panel 52, in which case a reference to a control panel herein includes all such structures.

The exemplary control panel 52 includes a display 54. Display 54 of the exemplary embodiment includes a visible display that is configured to be able to output visible instructions to users of the depository 12. It should be appreciated that the visible display may be operative in accordance with its programming to present instructions of multiple types in multiple languages and/or in other human or machine readable formats as are suitable for the application in which the particular depository is used. The exemplary depository further includes an image sensor 56. Image sensor 56 of exemplary embodiments is capable of reading the appearance feature or features associated with the deposit item which is to be deposited within the depository. Of course it should be understood that the control panels of other exemplary embodiments may include other or additional features.

The exemplary embodiment of the depository 12 further includes a manual unlock mechanism which includes a key lock 58. The key lock 58 in an exemplary embodiment may be used by depositors who have a proper key to make deposits into the depository. These deposit items need not include the appearance features which are recognized by the control panel of the depository. This enables the depository to be used both for pre-registered deposits as well as deposits which have not been pre-registered. In some exemplary arrangements the key lock feature may be omitted such that the depository may be operated only to accept deposits that are recognized as pre-registered by the depository system. Of course these approaches are exemplary and in other embodiments, other approaches may be used.

Figure 4:
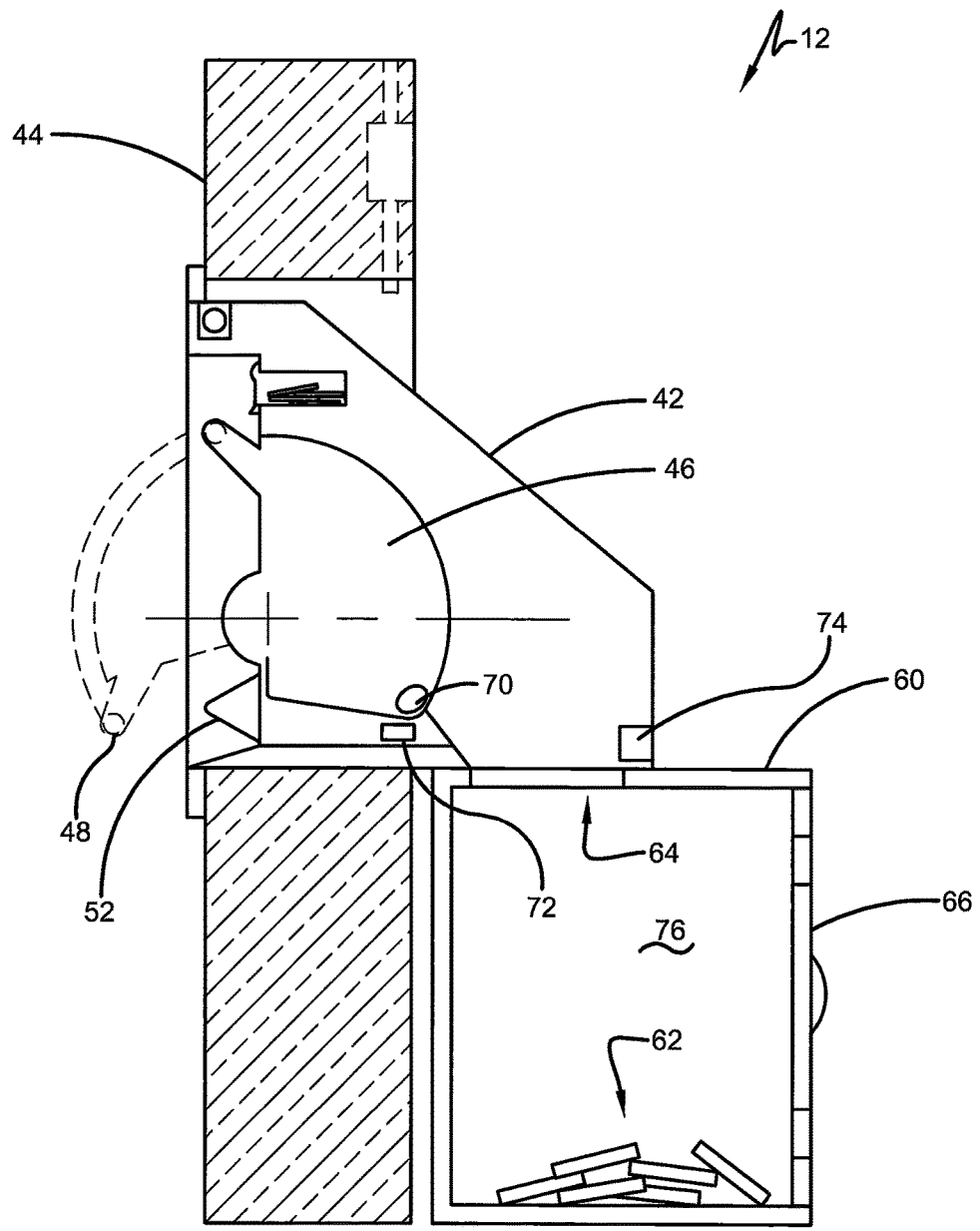
FIG. 4 is a schematic cross-sectional side view of the exemplary depository.
Figure 5:
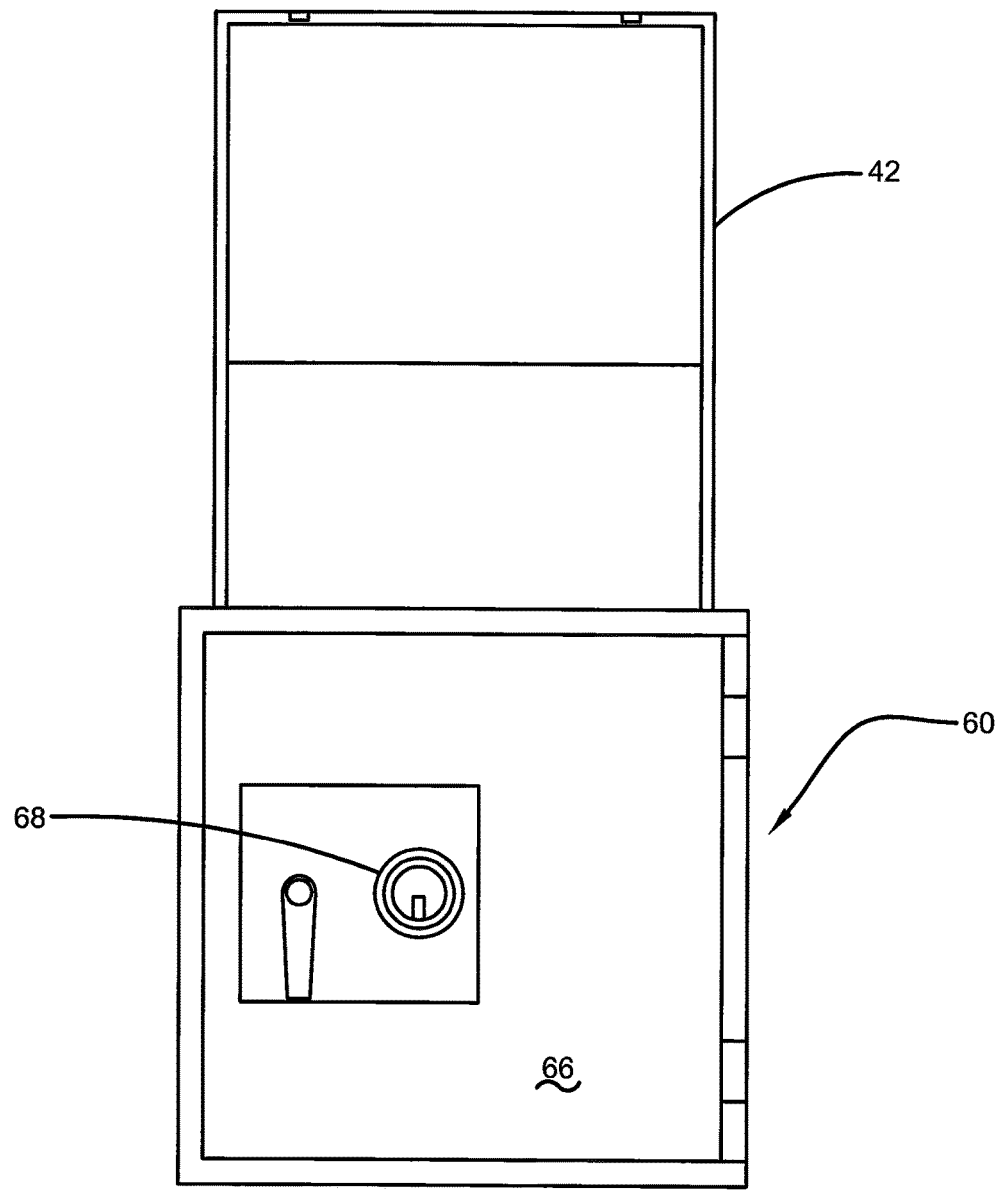
FIG. 5 is a back view of the exemplary depository.

As shown in the side cutaway view in FIG. 4, depository 12 further includes a safe 60. Safe 60 of the exemplary embodiment provides a secure enclosure or chest. Deposit items 62 which have been accepted by the depository are held in the interior area 76 of the safe until they are removed by authorized personnel. The safe 60 is positioned below the depository head and has an opening 64 that enables deposit items that have been accepted into the depository through operation of the head to move into the interior area of the safe. As shown in FIG. 5, the exemplary safe 60 includes a door 66. The door 66 is generally held in a closed and locked condition by a lock schematically indicated 68. Authorized persons are enabled to unlock the lock and open the door to remove the deposit items. Such authorized persons in the exemplary embodiment may include bank personnel or the employees of an armored car company or other company that transports cash or valuable items.

In the exemplary arrangement, the depository head includes a lock member 70. The lock member 70 is selectively movable between locked and unlocked positions. In the unlocked position of the lock member 70, a user is enabled to manually move the depository drum 46 between open and closed positions such that the depository head can accept a deposit item therein. In the locked position of the lock member 70, the drum is held in a closed position so that no deposits can be accepted. The exemplary arrangement further includes at least one drum sensor 72. The at least one drum sensor 72 is operative to sense the drum 46 in at least one position. Such drum sensors may include contact or non-contact sensors, optical encoders, photo sensors or similar sensors. At least one deposit sensor 74 is also positioned in connection with the depository. The at least one deposit sensor is configured to sense accepted deposit items. The deposit sensors in exemplary arrangements may include optical sensors, image sensors, acoustic sensors or other sensors suitable for detecting a deposit item. In the exemplary embodiment the at least one deposit sensor 74 is operative to sense deposit items moving from the drum toward the interior area 76 of the safe in which deposit items are held. Of course it should be understood that this arrangement is exemplary and in other embodiments other arrangements may be used.

Figure 10:
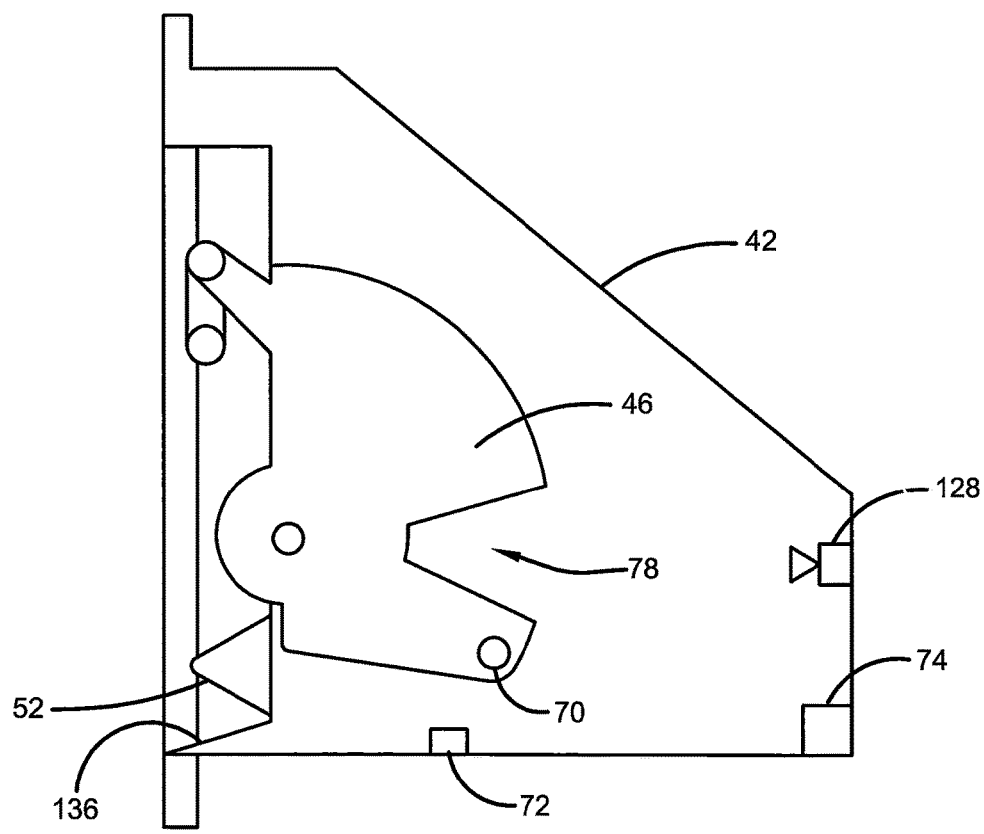
FIG. 10 is a simplified side view of an exemplary depository head with the drum in a closed position.
Figure 11:
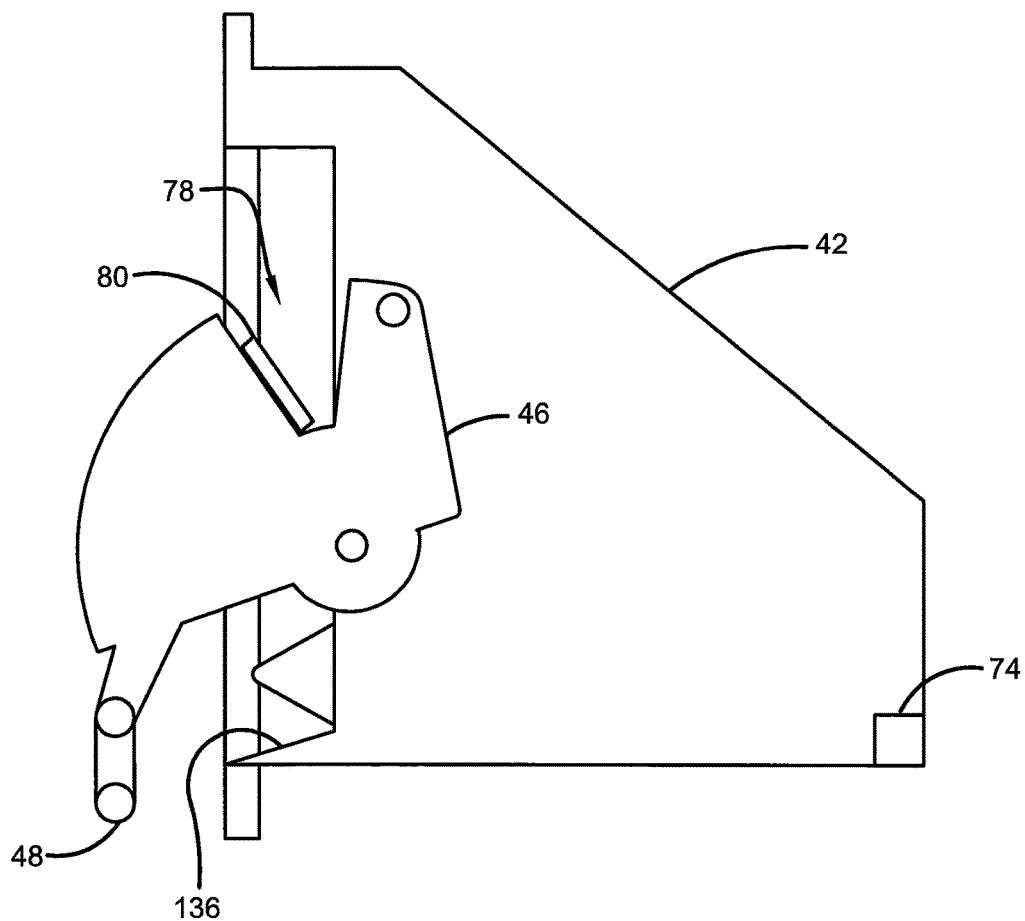
FIG. 11 is a view similar to FIG. 10 but with the drum in the open position exposing a pocket which accepts a deposit item.

As shown schematically in FIG. 10, the drum 46 in cross section includes a pocket 78 which is configured to accept deposit items such as deposit bags therein. In the closed position of the drum 46 shown in FIG. 10, the pocket is positioned within the interior area of the depository head 42 and is not externally accessible. In this position the drum 46 may be held in the closed position through operation of the lock member in the locked position in the manner later discussed. In circumstances where the lock member is moved to the unlocked position, the drum 46 is enabled to be rotationally moved through user engagement with the handle 48 to the position shown in FIG. 11. In this open position of the drum 46, the pocket 78 is externally accessible such that a depository user can place a deposit item schematically indicated 80 therein. The deposit item 80 may be one of the types of deposit items previously discussed and which is configured to fit within the interior area of the pocket.

Figure 12:
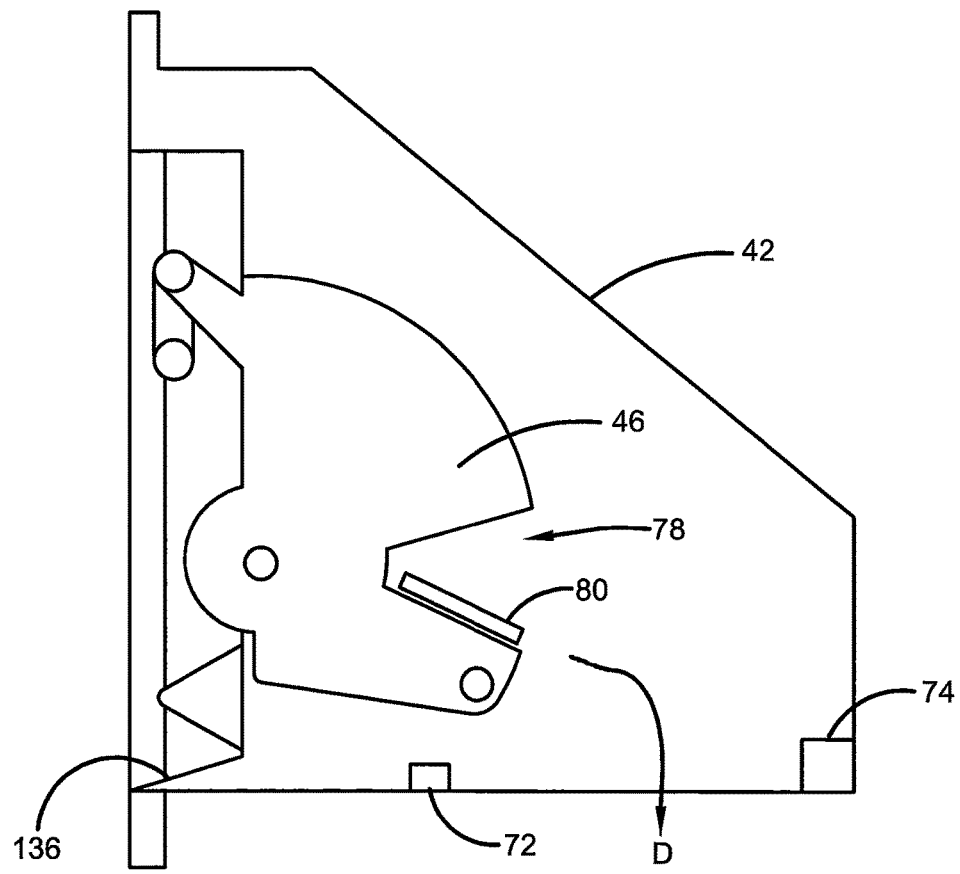
FIG. 12 is a view similar to FIG. 11 showing the deposit item disengaging from the drum when the drum is returned to the closed position.
Figure 13:
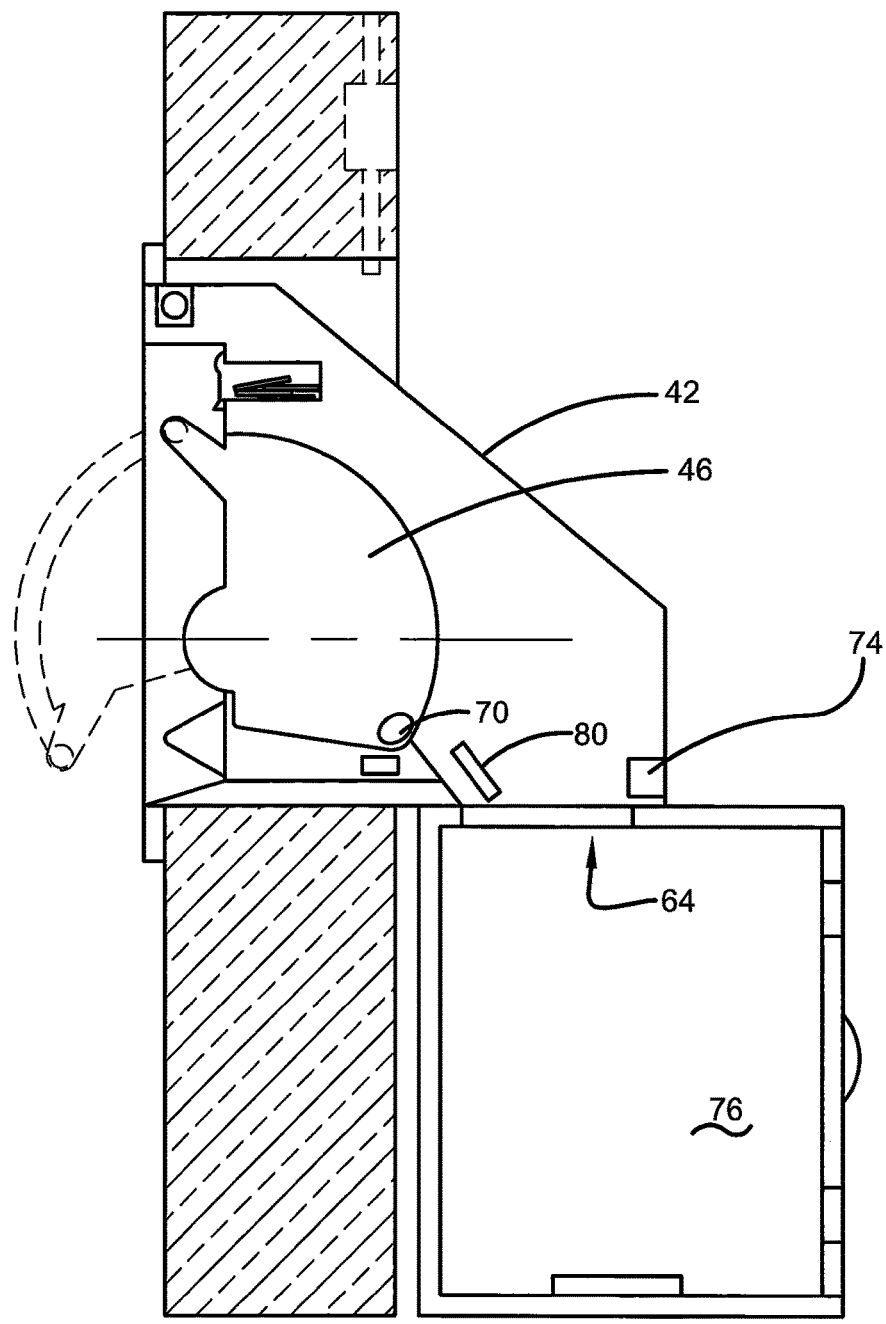
FIG. 13 is a simplified side view of the depository showing the deposit item having disengaged from the drum and falling into the safe while being detected by the deposit sensor.

Once the deposit item is in place in the pocket, of the drum may be returned to the closed position shown in FIG. 12. In this position the pocket 78 is configured to cause the deposit item 80 to fall downward and away from the pocket in the direction of Arrow D so as to disengage from the drum. The deposit item moves downwardly through the opening 64 and into the interior area of the safe. As can be appreciated from FIGS. 12 and 13, the deposit item moving toward the interior area 76 of the safe can be detected by the one or more deposit sensors 74. In this manner the fact that the deposit item has been inserted and received by the depository is confirmed in the manner subsequently discussed. In addition, the at least one drum sensor 72 can be utilized to determine that the drum 46 has been returned to the closed position. This enables the lock member 70 to be returned to the locked position so that the drum 46 can no longer be moved to the open position so as to help maintain the secure status of the depository. Of course as previously stated, the drum and depository head arrangement is exemplary. Other arrangements may use other drum configurations of a rotatable or other nature which enable deposit items to be received in a controlled manner into the depository.

Figure 6:
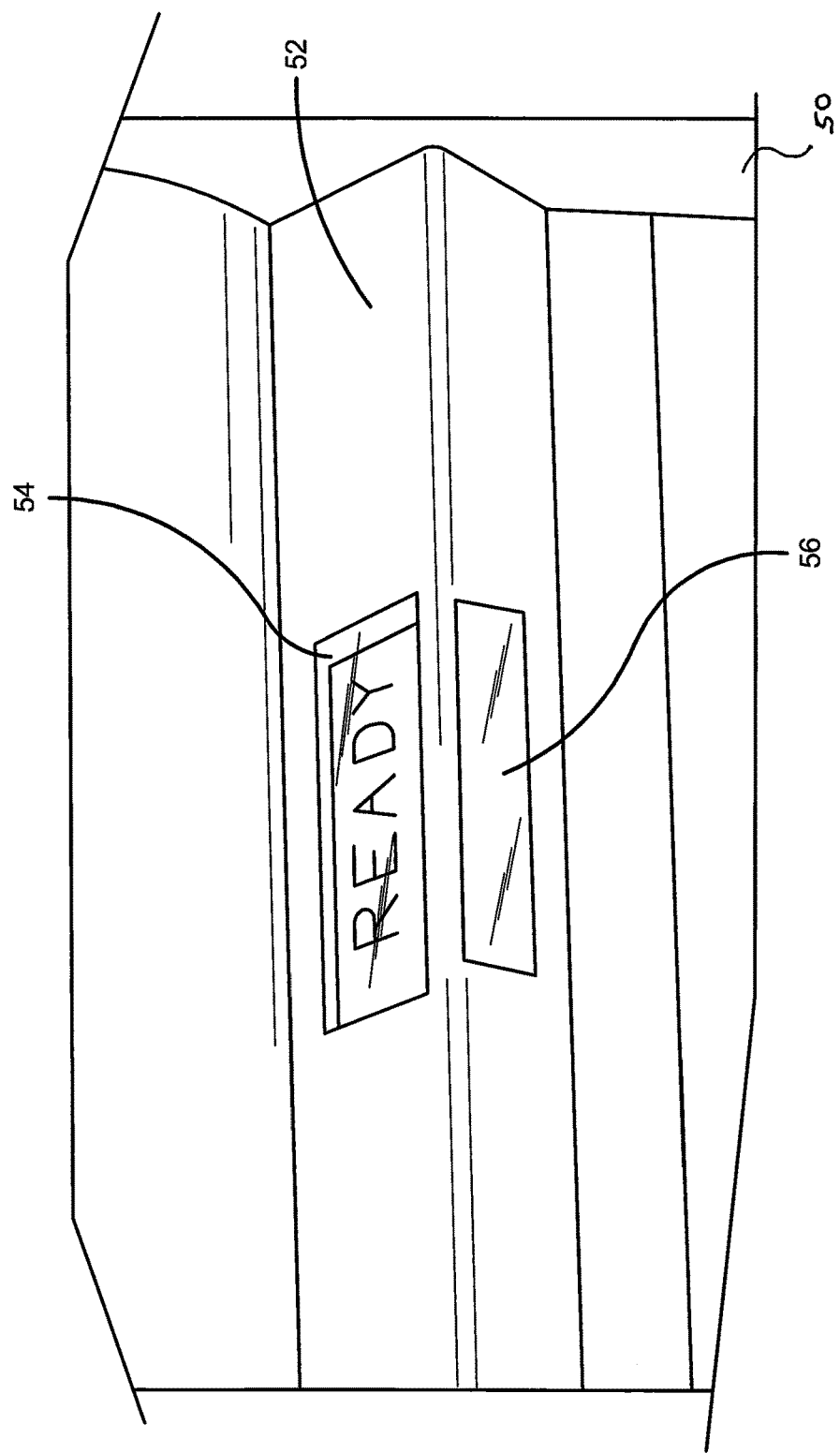
FIG. 6 is an enlarged isometric view of an exemplary control panel.
Figure 7:
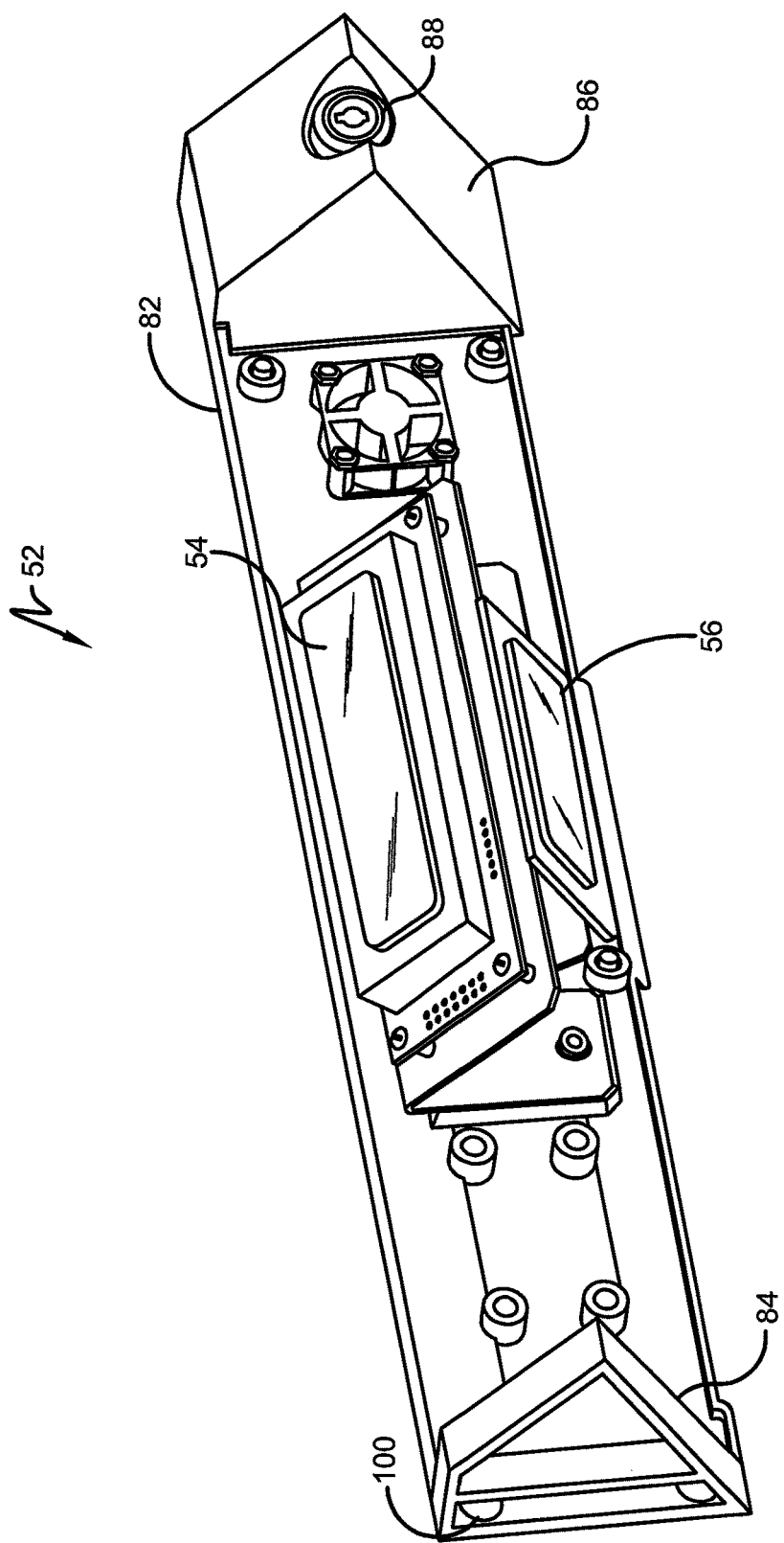
FIG. 7 is an isometric view of the control panel with the outer cover removed and showing the positions of the display and image sensor.
Figure 8:
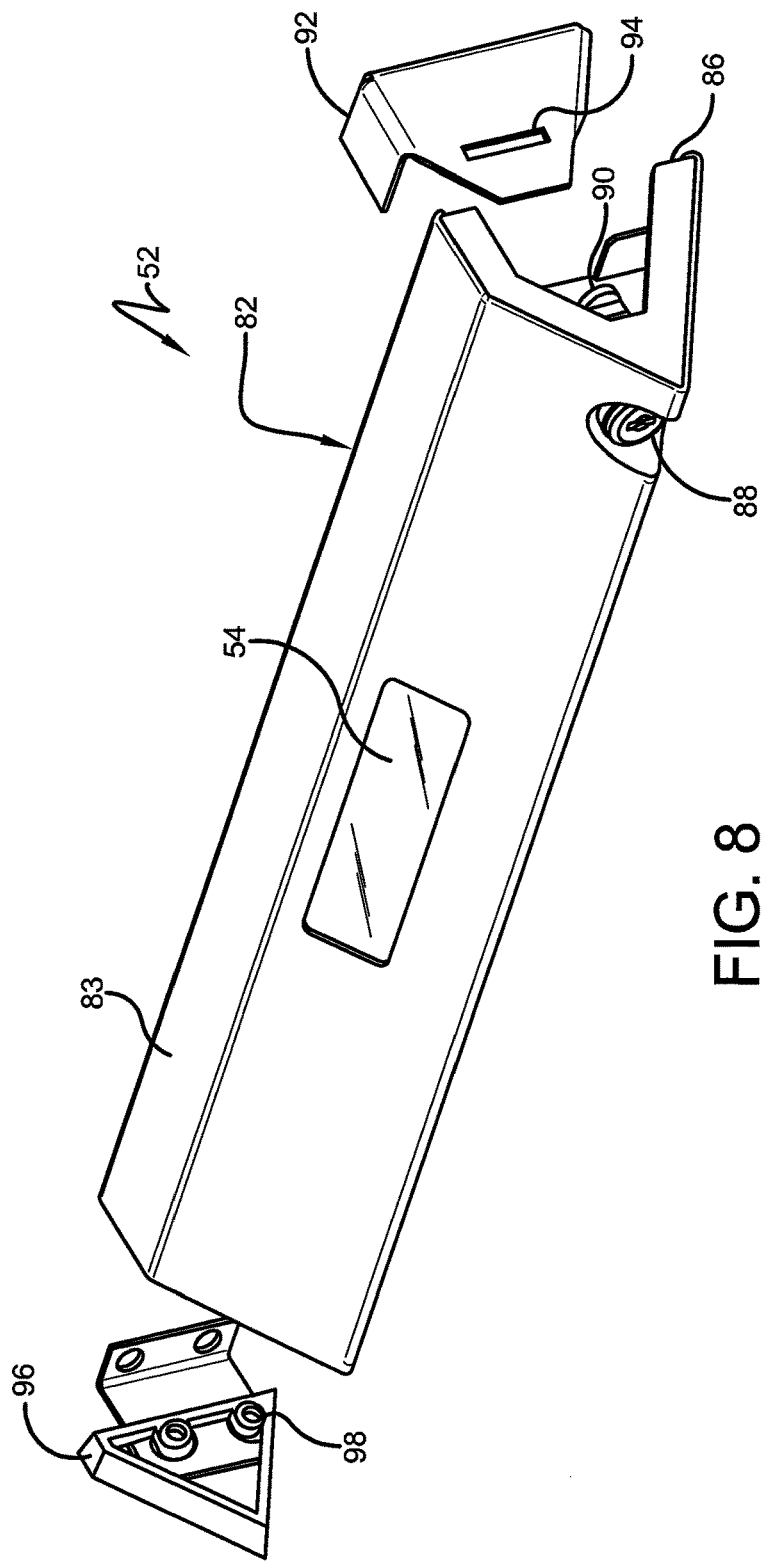
FIG. 8 is an isometric view similar to FIG. 7 of the exemplary control panel with the cover in place and showing the exemplary mounting arrangement for releasibly fastening the control panel in engaged relation with the depository.

FIGS. 6, 7 and 8 show exemplary aspects of the control panel 52. The exemplary control panel 52 includes the display 54 for providing visual instructions or other information to users of the depository. The exemplary control panel further includes the image sensor 56 that in an exemplary embodiment is operative to capture images of at least one appearance feature associated with the deposit items and to perform other functions which are later discussed. The exemplary control panel structure includes an underlying base 82 shown in FIG. 7. The base 82 is operative to support the display and the image sensor on respective bracket structures that are supported on the base. The base further includes a pointed support engaging structure 84 at a first end thereof. The structure 84 is a pointed configuration which underlies the pointed configuration of an outer cover 83 which is visible to users in the operative position of the control panel 52. Structure 84 is also operative in an exemplary embodiment to interengage with structures on an adjacent bracket as later discussed.

The base 82 further includes a second end structure 86. End structure 86 also has a similar pointed configuration and underlies the external cover 83. End structure 86 further supports a cylinder lock 88. Cylinder lock 88 is rotatably movable via an appropriate key or similar device to rotate a bolt 90 as best shown in FIG. 8.

A strike bracket 92 is operatively connected to the face of the depository 12 through fasteners or other attaching members. The strike bracket 92 includes a bolt accepting opening 94. Bolt accepting opening 94 is configured to accept therein the end portion of the bolt 90. As a result when the end structure 86 of the base 82 is positioned in overlying relation of the strike bracket 92, the control panel can be selectively locked in engaged relation with the depository. This is done using an appropriate key to rotate the cylinder lock 88 such that the bolt 90 extends in the bolt accepting opening 94. Similarly the control panel 52 can be disengaged from the depository by using an appropriate key to cause the bolt to disengage from the bolt accepting opening.

In the exemplary arrangement, a bracket 96 is engaged with the depository at an opposed end of the control panel from strike bracket 92. Bracket 96 is attached to the depository through suitable fasteners or other attaching structures. Bracket 96 has a pointed configuration that generally conforms with the end structure 84 and underlies the cover 83 of the control panel. The exemplary bracket 96 includes projections 98 that extend inwardly. The projections 98 are configured to extend in projection accepting opening 100 in structure 84 as shown in FIG. 7. In this exemplary arrangement the control panel can be releasibly engaged with the depository by extending the projections 98 into the projection accepting opening 100 while the opposite end of the control panel including the cylinder lock is disposed angularly and somewhat away from the strike bracket 92. Moving the control panel end away from bracket 96 toward the depository and the strike bracket 92 enables the projections 98 to firmly engage in the projection accepting opening 100. In this position the base 82 of the control panel 52 is flush against the adjacent depository surface. Also in this position the cylinder lock 88 can be rotated such that the bolt 90 engages the bolt accepting opening 94. The key can then be removed from the cylinder lock and the bracket held in fixed operative engagement with the depository until it is removed by authorized persons who have the key. This exemplary arrangement enables the control panel to be installed onto existing depository head structures. This facilitates adding the capabilities to automatically opening a depository in response to indicia on deposits to existing depositories that previously operated only in response to the input of a physical key. Further, this exemplary structure enables the control panel to be readily removed from the depository head for servicing or replacement. The ability to rapidly access and repair the control panel or to replace it entirely with another unit increases uptime and availability of the depository for use by customers. Of course it should be understood that this approach is exemplary and in other embodiments other approaches may be used.

Figure 9:
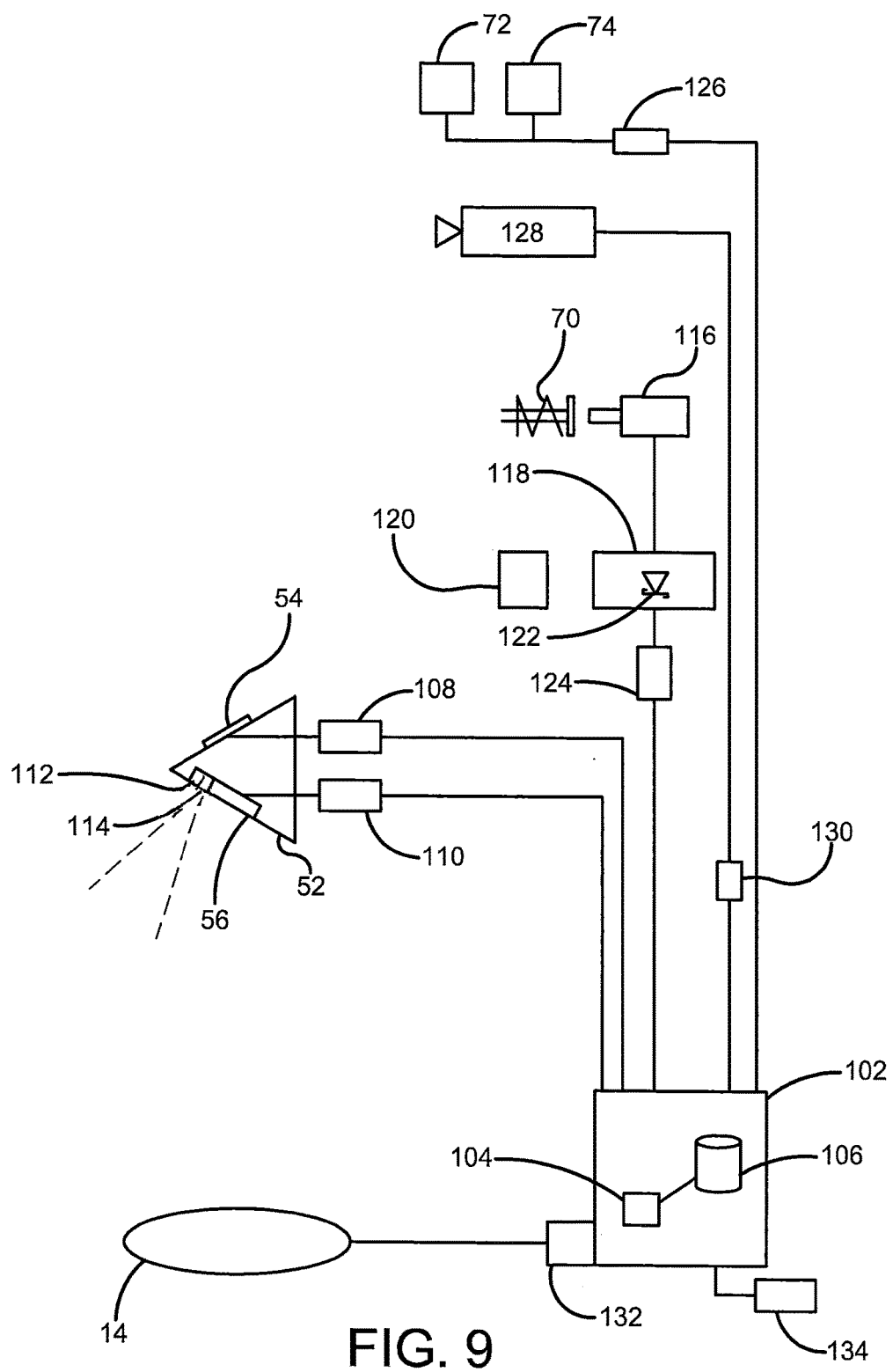
FIG. 9 is a simplified schematic view of the circuitry associated with the exemplary depository.

FIG. 9 shows schematically electrical components associated with the depository of the exemplary embodiment. A controller 102 is provided for purposes of controlling operation of the depository components and also communicating with the remote server. It should be understood that while in the schematic representation shown in FIG. 9 only one controller device is shown, other embodiments may include a plurality of separate or distributed controllers to perform the described functions. In still other exemplary embodiments, the controller may be part of another device. For example the controller utilized for operating the depository may be included in an automated banking machine. Such automated banking machines may include an automated teller machine, a teller cash recycler or other device that is in operative connection with the depository. In other arrangements, the controller may be part of a server or other computer that communicates with other devices in the facility such as a branch bank. Such a server may be used to operate and track activities at other devices or with other systems in addition to the depository. Of course these approaches are merely exemplary of the different approaches that may be used. In the exemplary depository, the controller is positioned so that it is generally secure from unauthorized access. The controller is located inside the building or other structure so that it is bounded by the wall 44. Further in some exemplary arrangements the controller 102 or portions thereof, may be positioned inside the safe 60. In other arrangements other approaches may be used.

The exemplary controller 102 includes at least one microprocessor 104 (which is alternatively referred to herein as a processor) and at least one data store 106. The microprocessor may in some arrangements include a PC board on which a microprocessor including a suitable BIOS, RAM and other hardware and software components and interfaces are provided. The data store 106 includes a tangible medium which includes computer executable instructions and data. The data store may include, for example, magnetic, optical or semiconductor storage media suitable for storing non-transitory computer executable instructions that may be executed through operation of the microprocessor. The controller also includes circuitry and other suitable interfaces for communicating with other devices as described herein.

The exemplary controller 102 may include one or more circuits which are operative to communicate electrical signals with and control the operation of devices associated with the depository. In exemplary arrangements the at least one processor may include a processor suitable for carrying out computer executable instructions that are stored in the one or more associated data stores. The processor includes or is in connection with a non-volatile storage medium including instructions that include a basic input/output system (BIOS). For example, processor may correspond to one or more or a combination of a CPU, FPGA, ASIC or any other integrated circuit or other type of circuit that is capable of processing data. The data stores may correspond to one or more of volatile or non-volatile memories such as random access memory, flash memory, magnetic memory, optical memory, solid state memory or other devices that are operative to store computer executable instructions and data. Computer executable instructions may include instructions in any of a plurality of programming languages and formats including, without limitation, routines, subroutines, programs, threads of execution, objects, methodologies and functions which carry out the actions such as those described herein. Structures for processors may include, correspond to and utilize the principles described in the textbook entitled Microprocessor Architecture, Programming, and Applications with the 8085 by Ramesh S. Gaonker (Prentiss Hall, 2002), which is incorporated herein by reference in its entirety.

The controller 102 is in operative connection with the display 54 of the control panel. The controller communicates with the display through a suitable interface 108. The display 54 of the exemplary embodiment comprises a display suitable for providing alphanumeric instructions and information to users of the depository. In the exemplary arrangement, the display is a two line, 20 character vacuum fluorescent display available from Noritake Company. The exemplary display is capable of providing different output levels of illumination to facilitate the use of the depository in various ambient lighting conditions. In some exemplary arrangements the controller 102 operates to adjust the display intensity output responsive to a sensor which is operative to sense ambient lighting conditions. As later discussed in more detail, the exemplary image sensor 56 performs a sensing function to determine ambient light levels. Alternatively in other arrangements, other sensors that are suitable for sensing ambient light conditions or other conditions can be used as a reference for adjusting the display output intensity may be used.

Image sensor 56 is also in operative connection with the controller 102. The image sensor communicates with the controller via a suitable interface 110. In the exemplary arrangement the imaging sensor is a CCD scanning reader. The image sensor is configured to capture the at least one appearance feature associated with the deposit item that is used by the system to determine if the at least one appearance feature corresponds to a pre-registered deposit.

In the exemplary arrangement, the image sensor is proximate to or includes a radiation source 112. The radiation source 112 of the exemplary embodiment operates to illuminate an area adjacent to the image sensor so that the appearance features on the deposit items have the images thereof captured through operation of the image sensor and the controller.

The exemplary arrangement further includes a target projector 114. The target projector is operative to project via visible radiation at least one visible marking onto an adjacent item. The projected marking output through operation of the target projector is operative to indicate a location to position an appearance feature on a deposit item for purposes of capturing the appearance feature through operation of the image sensor. The target projector may be integral with the image sensor or may be made up of separate components which perform these functions. In the exemplary arrangement the image sensor comprises a green laser which produces a fan line which is visible on the imaged surface and facilitates the positioning thereof. Some exemplary arrangements may provide an image sensor that includes the scanning sensors such as CCD sensors as well as the radiation source such as illumination LEDs and the target projector. An example of such an image sensor is a Model N5680 made by Honeywell Corporation. Of course in other embodiments other devices and approaches may be used.

As previously discussed, in the exemplary arrangement the lock member 70 which is shown schematically in FIG. 9 is selectively moved between locked and unlocked positions. This is accomplished in the exemplary system through operation of an electromagnetic actuator 116. The electromagnetic actuator includes a solenoid which operates to selectively cause the lock member to be in the locked and unlocked positions based on the solenoid being energized and de-energized. It should be understood, however, that while the electromagnetic actuator of the exemplary arrangement includes one or more solenoids, other types of actuators and electromagnetic actuators may be used. These include, for example, motors such as stepper motors or other motors that selectively control rotational displacement and/or speed, linear actuators or other suitable devices that impart and selectively position the one or more lock members that control the movement of the drum. Further it should be understood that while in the exemplary arrangement the depository drum is moved through manual action, in other arrangements the drum of the depository may be moved in response to a drive device. In such arrangements the actuator 116 may include or work in coordinated relation with the drive device or devices that are operative to move or enable movement of the drum.

In the exemplary arrangement the solenoid 116 is driven by electrical signals from an actuator module 118. The actuator module 118 is in operative connection with or may include a power supply 120. Power produced through operation of the power supply 120 is a relatively higher power that is needed for purposes of operating the solenoid 116. The actuator module 118 is operative to receive relatively low power signals based on signals originating from the controller and in response thereto, is operative to cause the higher power signals at voltage and current levels from the power supply to be delivered to and removed from the solenoid 116.

The exemplary actuator module includes circuitry suitable for operating in the system. Such circuitry includes a solenoid driver which is suitable for controlling the delivery and shut off of power from the power supply to the solenoid. The exemplary actuator module further includes anti-reverse current circuitry. The anti-reverse current circuitry is operative to provide reverse current protection for electronic components upstream of the actuator module. Reverse current and EMF spikes may be produced during operation of the actuator module in controlling the delivery and removal of electrical power to the solenoid. Such current spikes might otherwise occur in situations when the current is shut off to the solenoid or other type of electromagnetic actuator. The exemplary anti-reverse current circuitry includes a Schottky diode schematically represented 122 or other suitable circuitry for assuring that upstream components from the actuator module operate reliably. In the exemplary arrangement the actuator module communicates with the controller 102 through an interface 124. In the exemplary arrangement the interface 124 includes a USB to RS232 adapter. However, in other embodiments other arrangements and devices may be used.

As schematically represented in FIG. 9, the sensors associated with the depository are also in operative connection with the controller 102. These include the drum sensor 72 and the deposit sensor 74. Such sensors are represented as in operative connection with the controller through an interface 126. Of course it should be understood that the arrangement shown is merely schematic and each sensor device may be in operative connection with the controller through separate interfaces. Further, numerous additional sensors, input devices, output devices or other components may be utilized in alternative arrangements and may be in operative connection with the controller 102.

The exemplary depository further includes a pocket inspection camera 128. The exemplary pocket inspection camera 128 is positioned within the depository head as shown in FIG. 10. The exemplary pocket inspection camera 128 is positioned to have a field of view which includes the pocket 78 of the drum. In the exemplary arrangement, the pocket inspection camera has the pocket in its field of view when the drum is in the closed position. However, this arrangement is exemplary. The pocket inspection camera is in operative connection with the controller through a suitable interface 130.

In the exemplary arrangement the pocket inspection camera is operative to produce signals which correspond to a pocket image which corresponds to the appearance of the pocket. In some cases criminals may attempt to compromise the depository by applying devices to the pocket. This might include, for example, applying a sticky substance or other item or material to or in the pocket so that a deposit item cannot exit therefrom when the drum is in the closed position. This may enable the next person to open the drum to obtain the prior depositor's item. Alternatively or in addition, criminals may attempt to compromise the depository by including devices in the pocket that may prevent the depository drum from moving to a position where it can be locked in the closed position. This may enable criminals to recover deposit items.

The exemplary pocket inspection camera 128 produces pocket image data which is indicative of the appearance condition of the pocket. In exemplary arrangements the pocket image data produced by the camera when the drum is in the closed position may be compared through operation of the controller 102 to stored image data which corresponds to the normal or previously stored appearance of the pocket. The controller 102 may operate in accordance with its programming to determine if the pocket image data produced by the camera differs when compared to the stored data in a manner which suggests that an effort to compromise the depository is being made. Further in some exemplary arrangements the controller may operate to make the deposit image data accessible to a remote system. This may include, for example, the controller operating to send signals which correspond to the pocket image to one or more remote servers where appropriate personnel can view and inspect the image and determine if an effort to compromise the depository is being made. Alternatively in some arrangements the controller may store pocket image data in the data store 106. The controller may then enable remote access to the pocket image data by allowing a remote authorized server to review such image data. Of course multiple approaches may be taken in using the image data that can be resolved by the pocket image camera.

Further, in some exemplary arrangements the pocket image camera may be movable in response to operation of the controller 102 to inspect selected internal areas of the depository. For example the camera may have a mounting that enables the field of view to be changed within the depository. This may enable automated inspection of various depository components through operation of the controller. It may also enable a remote servicer or other authorized person to inspect the interior of the depository for purposes of verifying that it is in the proper condition or alternatively that attempts are being made to compromise its integrity.

In some exemplary arrangements the camera 128 may be used in conjunction with or as a substitute for the deposit sensor 74 to verify that a deposit item has been accepted into the depository after the deposit item has been scanned. Further in some exemplary arrangements, multiple pocket image cameras or other cameras may be positioned within the depository head such that they can read the two-dimensional bar code or otherwise capture the at least one appearance feature on the deposit item that has been placed into the depository. In such situations, the controller 102 may operate in accordance with its programming to verify that the at least one appearance feature read through operation of the image sensor 56 and which is utilized for purposes of enabling the user to access the depository, is the same deposit item which is deposited by the user. If the appearance feature on the deposit item that is read by the external image sensor 56 differs from the at least one appearance on the deposit item that is received by the depository, the controller may operate in accordance with its programming to generate one or more alarm signals. The one or more alarm signals may be utilized or reacted to by the controller to provide outputs to the user as well as to provide a remote alarm to cause the depository to go out of operation or otherwise cause the depository to take programmed steps that are appropriate under the circumstances.

The exemplary controller includes or is in operative connection with a transceiver 132. The transceiver 132 operates to communicate with the one or more remote servers through the one or more networks 14 as previously described. In some exemplary arrangements the transceiver 132 may be an interface that enables networked communications over a wire or optical system. In some arrangements the transceiver may include a network interface card. In other arrangements, the transceiver may be a wireless transceiver such as is suitable for communication via cellular or WiFi communications. Of course these approaches are exemplary and in other embodiments, other approaches may be used.

The exemplary controller 102 includes or is in operative connection with a connector 134. In the exemplary arrangement the connector 134 may be utilized to provide releasable connection of the controller with a device such as a solid state memory device. Connector 134 may be used in some arrangements to receive instructions that can be programmed into the controller through operation of the microprocessor and stored in the database 106. In other arrangements the connector 134 may be utilized for purposes such as providing records, historical data, operating information or other information stored in the data store to a separate device which is connected by a servicer or other authorized user. The connector may also be connected to other devices in other arrangements for purposes of providing alternative modes of communication through a network other than network 14, which may be done for example in some cases to enable a remote servicer to troubleshoot possible problems with the depository. It may also be utilized for purposes of enabling persons responsible for removing deposit items from the safe to determine the level of deposit items therein. It may also be used for purposes of connecting to and/or communicating with other devices and/or systems.

In the exemplary embodiment the controller 102 includes programming which comprises a scan engine that is suitable for recognizing a plurality of forms of machine readable indicia. Such machine readable indicia may include the appearance features which are utilized for purposes of identifying each particular deposit item. This may include one and two-dimensional bar codes or other types of codes, characters, patterns or features which are included on deposit items.

Further in some exemplary arrangements the controller may include machine executable instructions in the at least one data store that are suitable for analyzing data in electronic images such as check images or currency bill images to determine if they correspond to the appearance features that have been associated with a particular deposit item. In such arrangements the programming may include the capability of locating the visible elements included on images of bills or checks. This may include for example in the case of a check, payor name and address data, micr line data, payee data, courtesy amount data and/or legal amount data. One or more of these visible elements or a combination thereof or a resolved value produced through the analysis thereof, may be utilized as to one or more appearance features which identify the particular deposit item. Likewise in the case of currency bills, the programming associated with the controller may be operative to read visible or otherwise detectable elements such as denomination values, serial number values, security threads or other detectable items which identify a particular currency bill which has the at least one appearance feature that is utilized for purposes of identifying the particular deposit. Of course it should be understood that other types of items or indicia may be utilized for purposes of providing the deposit identifying appearance feature, and suitable programming may be provided in the particular controller for enabling the data captured through operation of the image sensor to be analyzed for purposes of resolving the one or more appearance features associated with the deposit item.

In some exemplary embodiments the controller may utilize scan engine software available from Honeywell Corporation for purposes of resolving appearance features. In other arrangements optical character recognition software, document analysis software or other suitable instructions available from entities such as Mitek Corporation or A2iA Corporation may also or alternatively be utilized for purposes of analyzing and generating data corresponding to appearance features on deposit items.

In the exemplary arrangement the controller 102 is enabled to be programmed through visible indicia that can be read through operation of the image sensor. Such programming may include instructions which may be stored in the data store which control the operation of the depository and the sending and receipt of messages from remote servers. The programming may also include instructions concerning the type and nature of appearance features and control how they are to be analyzed. Further in exemplary arrangements, the programming capability provided through operation of the image sensor and the associated controller enable the controller to change the intensity of the output from the display 54 in response to ambient light levels sensed through operation of the image sensor 56. In some exemplary arrangements the controller operates responsive to detecting high ambient light levels to increase the output intensity of the display. This enables the display outputs to be more readily read in bright sunlight, for example. The controller may operate to reduce the intensity of display outputs when lower ambient light levels are detected. In some exemplary arrangements the controller may be programmed to determine if the ambient light level is below a threshold. This threshold may correspond to a condition where security lighting adjacent to the depository to illuminate the area of the depository at night is not operating. In such arrangements the controller may operate in response to detecting that the ambient lighting conditions remain below the threshold for more than a set time to cause the depository to cease operation. In such circumstances the controller may operate to cause the display to provide an output indicating that the depository is out of service. Such approaches may discourage users from attempting to operate the depository when the available ambient lighting is unsuitable.

Further in some exemplary arrangements, the programming which can be provided through reading visible indicia through the image sensor includes instructions which are operative to cause the controller to no longer change its operational programming in response to the reading of visible indicia. This can be done to prevent security exploits that might be attempted by criminals attempting to reprogram the operation of the controller. Such programming may effectively prevent further changes to stored software instructions in some embodiments which control the operation of the depository. In some exemplary arrangements once the controller has received the instructions to no longer change the programming thereof in response to indicia read through operation of the image sensor, the programming in the controller may only enable changes thereto by connecting a suitable terminal or other device to the connector or otherwise providing certain specified inputs in a secure manner which indicate that an authorized person has gained access to the connector and/or the controller and provides suitable instructions to again enable changes to the programming thereof. Suitable security provisions such as passwords, digital signatures and the like may be stored or otherwise utilized in connection with the programming of the controller 102 to assure that only authorized individuals are enabled to allow the controller to change its programming once the processor has received the instructions by reading the visible indicia to prevent such further changes.

As can be appreciated, this exemplary arrangement enables rapid configuration of depositories through the reading of two-dimensional bar codes such as QR codes and the like which may contain a great deal of data. Such programming and configuration may be accomplished rapidly and without the need for network connections or other features which might render such programming more complicated. Of course it should be understood that this approach is exemplary and in other arrangements, other approaches may be used.

In some exemplary arrangements, the programming associated with the controller may also provide diagnostic capabilities that can be accessed as a result of the reading of visible indicia by the image sensor. For example the programming associated with the controller may provide for the output of certain configuration data in response to the reading of certain two-dimensional bar codes. The values represented by the bar codes may be determined and cause the controller to indicate software version information, firmware versions, software update status, capabilities that are enabled and disabled, status of connected devices and other configuration information associated with the controller and connected devices. In other arrangements the reading of visible indicia by the image sensor may be operative to cause the controller to provide information concerning each of the peripheral devices and the communication status of each. In still other arrangements the controller may be operative to provide network status information and communication configuration data in response to the reading of visible indicia. In still other exemplary arrangements, the controller may operate in accordance with its programming to store information about malfunctions or potentially irregular conditions or operating parameters that are sensed during operation of the depository. The controller may operate in accordance with its programming to provide outputs corresponding to this information through the display or through a wireless output portal or other output device on the control panel. The provision of such information may enable a servicer to identify particular sensors, actuators or other devices that are malfunctioning or may be tending toward a malfunction condition such that such items can be replaced. Further in some exemplary arrangements the controller may operate to recognize visible indica read through the image sensor that corresponds to firmware or software updates. The controller may read such visible indicia, resolve the update data for the firmware or software and apply the update to the controller or other appropriate device in the depository. The controller may also operate in response to such read indicia to reboot the system or take such other actions as may be necessary to apply the update. In such exemplary arrangements the visible indicia may be read from a hard copy included in a manual or other similar programming reference publication. Alternatively or in addition, in some exemplary arrangements, the visible indicia may be read from a display of a mobile device such as a mobile phone or tablet. Of course it should be understood that these approaches are exemplary and in other arrangements, other approaches may be used.

In operation of an exemplary embodiment, deposit items include at least one deposit appearance feature data corresponding to which has been provided by or registered with the remote server. The at least one appearance feature is associated with the deposit data associated with the particular deposit item that is to be deposited by the user through operation of the depository. The stored data associated with the deposit item may include information regarding the content of the deposit item and the value thereof. The data associated with the deposit item may also include account data which identifies the particular account associated with the entity that is to make the deposit.

Further in some exemplary embodiments the data associated with the account and/or the deposit items may be associated with a particular token value that is resolved through operation of the at least one remote server 16. Such one or more token values may be provided to the user computer 22 and included in the at least one appearance feature. Such token values when included in the appearance feature data may be utilized for purposes of recovering account data, deposit data or other sensitive data regarding the account holder who makes the deposit from one or more data stores that can be accessed by the remote server. In such exemplary arrangements because the token data cannot be utilized to resolve account data or other sensitive information absent data stored in memory in connection with the at least one remote server, the publication or compromise of such token data does not result in the loss of valuable private information of the customer. Of course it should be understood that this approach is exemplary and in other embodiments, other approaches may be used.

The exemplary depository when sitting in an idle state may operate in accordance with its programming to cause suitable messages to be output through the display 54. Such messages may include suitable instructions such as indicating that the depository is ready for operation. Such messages may also include information on where to place the deposit item in order for the deposit identifying information to be imaged. Periodic messages of different types may also be output through the display when the depository is in an idle condition waiting for a user to present a deposit item.

In the exemplary embodiment in an idle state, the image sensor 56 is operated responsive to the controller 102 in a sense mode. In the sense mode, the image sensor operates in a low power consumption manner. The CCDs (charge-coupled devices) or other suitable sensors in the image sensor 56 operate to capture image data which is analyzed through operation of the controller 102 to sense that an object is moving within the field of view of the image sensor. The data received from the image sensor is analyzed to determine if an object has moved within the field of view. This is accomplished by rapidly capturing a series of images and comparing the pixel values which comprise the image data in each to determine if the nature of the change suggests that an object has entered the field of view. Of course this approach is exemplary.

In an exemplary embodiment when the image sensor is operated in a sense mode, the radiation sources 112 may be off or otherwise operated in a low radiation output mode to illuminate the area adjacent to the image sensor. In this way power can be conserved when no sensed deposit item is in the field of view of the image sensor. In some arrangements ambient or area lighting may be provided adjacent to the depository exterior for purposes of enabling the image sensor to operate in the sense mode without the radiation sources, which in the exemplary arrangement comprise red LEDs, to output a large amount of radiation. Further in some exemplary arrangements a shield member 136 is positioned as shown in FIG. 12 in a location in the field of view and disposed from the image sensor. The shield member of exemplary embodiments is configured such that the deposit item and the at least one appearance feature thereon can be positioned between the image sensor and the shield member. The shield member of an exemplary arrangement is configured such that the image sensor when operated with the controller in the sense mode does not sense the movement of leaves or other adjacent items or individuals which may be adjacent to the exterior of the depository and falsely cause the depository to change its mode of operation.

In an exemplary arrangement when the controller and image sensor are operated in the sense mode, the movement of an item is sensed adjacent to the image sensor, causes the controller to operate in accordance with its programming to begin to operate in a read mode. In an exemplary read mode the radiation sources 112 illuminate to a relatively higher level sufficient for enabling the image sensor to capture images of the at least one appearance feature. In the read mode, the controller also causes the target projector 114 to operate. This provides a projected mark or other indications which show the user where to position the at least one appearance feature on the deposit item for purposes of reading. The controller then operates to cause the image sensor to capture images which may include the suitable appearance feature for a period of time such that at least one image may be captured thereof. Suitable programming associated with the controller analyzes image data captured by the image sensor and determines if it corresponds to a two-dimensional bar code or other appearance feature that may identify a pre-registered deposit item. In response to a determination that at least one image that is captured corresponds to an appearance feature of the type used to identify a deposit item, the controller then operates to generate data corresponding to the appearance feature. The controller of the exemplary embodiment operates to cause the image sensor to operate in the read mode for a period of time and if no image data corresponding to an appropriate appearance feature is captured, the controller causes the image sensor and controller to again operate in the sense mode. In this mode the output from the radiation source is reduced, perhaps in some embodiments to the point of shutting off the radiation source, and the target projector no longer operates.

It should be understood that these approaches are exemplary and in other exemplary arrangements, the image sensor may operate in a read mode at all times during operation. Further in other exemplary arrangements the control panel 52 may include a manual actuator such as a push button 138 shown in FIG. 14. The push button 138 may operate an electrical switch that is in operative connection with the controller. The user may actuate the push button 138 to cause the image sensor to change from an off condition to a read mode. In some exemplary arrangements, the manual actuator 138 may be provided in connection with a depository that normally operates to automatically sense a deposit item within the field of view of the image sensor. The manual actuator may be utilized in circumstances where the movement of the deposit item in the field of view of the image sensor is somehow not detected by the image sensor and the controller.

Alternatively the controller may operate in windy conditions or other circumstances such as where the image sensor is sensing motion of shadows or other extraneous items to try to avoid false motion sensing signals by not changing from the sense mode to the read mode in response to each circumstance that would otherwise cause such a change. In these circumstances, the controller may operate in accordance with its programming to cease continuous operation in the sense mode and to present instructions through the display 54 that instruct the user to activate the push button 138 to read the appearance feature from the deposit item. In such systems the controller may cause the system to periodically return to sense mode and revert to automatic operation and sensing of appearance features when the frequency of detection of movement due to windy conditions, etc. has subsided. In still other circumstances such as where the image sensor has become dirty, the controller may detect such condition based on the level of ambient light sensed by the image sensor. Alternatively or in addition the controller may verify the build up of dirt on the image sensor by operating in accordance with its programming to illuminate the area by turning on the radiation source and evaluating the illumination level that can be detected. In response to making a determination that the level of radiation sensed corresponds to a dirty image sensor, the controller operates in accordance with its programming to cease continuous operation in the sense mode and provide an output through the display to push button 138 to read the appearance feature. Of course these approaches are exemplary and in other arrangements, other approaches may be used.

The exemplary arrangement controller operates to provide instructions through the display to the user. Thus for example when the controller causes a change from the sense mode to the read mode, the display outputs a message instructing the user to place the appearance feature, such as the bar code on a deposit item, adjacent to the reader. Once the image data corresponding to the bar code has been captured, the controller operates in accordance with its programming to generate appearance data corresponding to the at least one appearance feature. In the exemplary arrangement, the controller then operates to send data corresponding to the appearance data in one or more messages to the remote server 16. This is done through operation of the transceiver 132. The controller may then operate in accordance with its programming while this information is being sent, to display a "please wait" or similar message to the user through the display.

The remote server 16 receives the data corresponding to the appearance data and operates in accordance with its programming to determine that the appearance data corresponds to a pre-registered deposit. Responsive to making this determination, the remote server 16 sends one or more messages indicating to the controller of the depository, data which corresponds to the determination that the deposit item is to be accepted. Of course if the determination is not made, and the read indicia does not correspond to an appropriate deposit item, messages including such a condition are sent to the controller. In response to receiving such messages indicating that the deposit item cannot be accepted, the controller operates to cause a "transaction declined" or similar message through the display to the user.

Assuming that the determination is made that the deposit item is acceptable, the controller then operates in accordance with its programming to communicate with the actuator module 118 to operate the solenoid 116. The solenoid 116 then operates in response to the actuator module and causes the lock member 70 to change from the locked position to the unlocked position. The controller operates to then cause the display to output one or more messages instructing the user to move the depository drum from the closed position to the open position. Such instructions may include, for example, instructions for the user to pull downward on the handle 48 of the depository or otherwise take appropriate action.

The exemplary controller then operates in accordance with its programming to determine that the user has moved the drum from the closed position to the open position. This is done by the controller sensing signals from the at least one drum sensor 72. The controller then operates in accordance with its programming to output one or more messages through the display instructing the user to place the deposit item in the pocket of the drum. The display then instructs the user that after placing the deposit item in the pocket, to move the drum to the closed position. Sensing of movement of the drum to the closed position is sensed through operation of the drum sensor 72.

In the exemplary arrangement, the controller operates to sense through operation of the deposit sensor 74 and/or the pocket inspection camera 128, to determine if the deposit item such as deposit item 80 in FIG. 12 has been received into the depository. Upon sensing the receipt of the deposit item, the exemplary controller 102 operates to generate at least one deposit signal. One or more messages are generated through operation of the controller responsive to the generation of the at least one deposit signal, which are sent to the remote server 16 through operation of the transceiver 132.

In an exemplary arrangement, the at least one remote server 16 operates in accordance with its programming to cause the account associated with the entity depositing the deposit item to have the account credited for the value of the items indicated as included as a part of with the pre-registered deposit. In some arrangements this may be done through operation of the remote server directly, changing data stored in the server's associated data store to credit the account. Alternatively and/or in addition, as represented in FIG. 1, the one or more servers 16 may communicate with servers or other computers located at a financial institution schematically indicated 140. Such communications may be made through suitable public or private networks 142. Computers at the financial institution 140 may operate responsive to the messages from the server 16 to cause the depositor's account to be credited with the value of the items associated with the deposit item. This credit may be reversed or modified at a later date if for some reason the content of the deposit item does not correspond to the pre-registered information. Of course these approaches are exemplary and in other arrangements other approaches may be used.

In the exemplary embodiment the at least one remote server 16 returns at least one message to the controller 102 indicative that the messages corresponding to the deposit signal have been received and successfully recorded. The controller 102 operates in accordance with its programming to indicate to the user through the display, that the deposit has been successfully received or otherwise recorded by the system. In some exemplary embodiments, the control panel 52 may include a printer or other suitable device for providing to the user a record of having made the deposit. This may include, for example, certain deposit details such as the identification of the depository or financial institution with which the depository is associated, as well as its location, the time of the deposit and/or other information which documents the transaction. Alternatively or in addition, the control panel may include a suitable interface which can provide receipt information to a user's mobile device. This may be done via Bluetooth, NFC or other suitable communication method which enables providing the user with a record of having made the deposit. Further in some exemplary systems, the remote server 16 may operate in accordance with its programming to provide an indication to the user's personal computer or mobile device one or more messages indicating that the deposit has been received. Of course these approaches are exemplary and in other embodiments other or additional approaches may be used.

In circumstances where the camera 128 is operative to read the appearance feature on the deposited item, and it is determined through operation of the controller that the appearance data on the deposit item deposited and the deposit item scanned do not correspond, the controller operates in accordance with its programming to generate at least one anomaly signal. Also in circumstances where a user has moved the drum to a position where it can receive a deposit but a deposit item is not sensed as received in the depository, at least one further anomaly signal may be generated through operation of the controller. In such circumstances the controller may operate in accordance with its programming to take certain actions in response to the generation of the at least one anomaly signal. Such actions may include, for example, the controller operating to move the lock member to a locked position so that if an attempted fraud activity is going on, no further movement of the drum can be conducted. The controller may also operate to send one or more messages to the remote server 16 and/or other computers to indicate an abnormal condition. Further in some circumstances, controller 102 may operate security cameras or other similar devices in the area of the depository to capture images of the person who is operating the depository so that such images can be accessed by bank officials or law enforcement in the event that fraud or an attempt to compromise the depository is being made.

In other situations such as when the depository drum has been opened and closed without receiving a deposit, the controller may operate in accordance with its programming to prompt a user to provide an indication such as via a manual or other type input device included on the control panel to indicate whether they made an error and wish to insert the deposit item. In such circumstances if the user provides an input that indicates that they wish to insert the deposit item, the controller operates in accordance with its programming to again enable the user to move the drum between the open and closed positions so as to enable the receipt of the deposit item. Of course these actions are exemplary of actions that a controller in connection with a depository may take in connection with receiving deposits and abnormal conditions that may arise.

Figure 14:
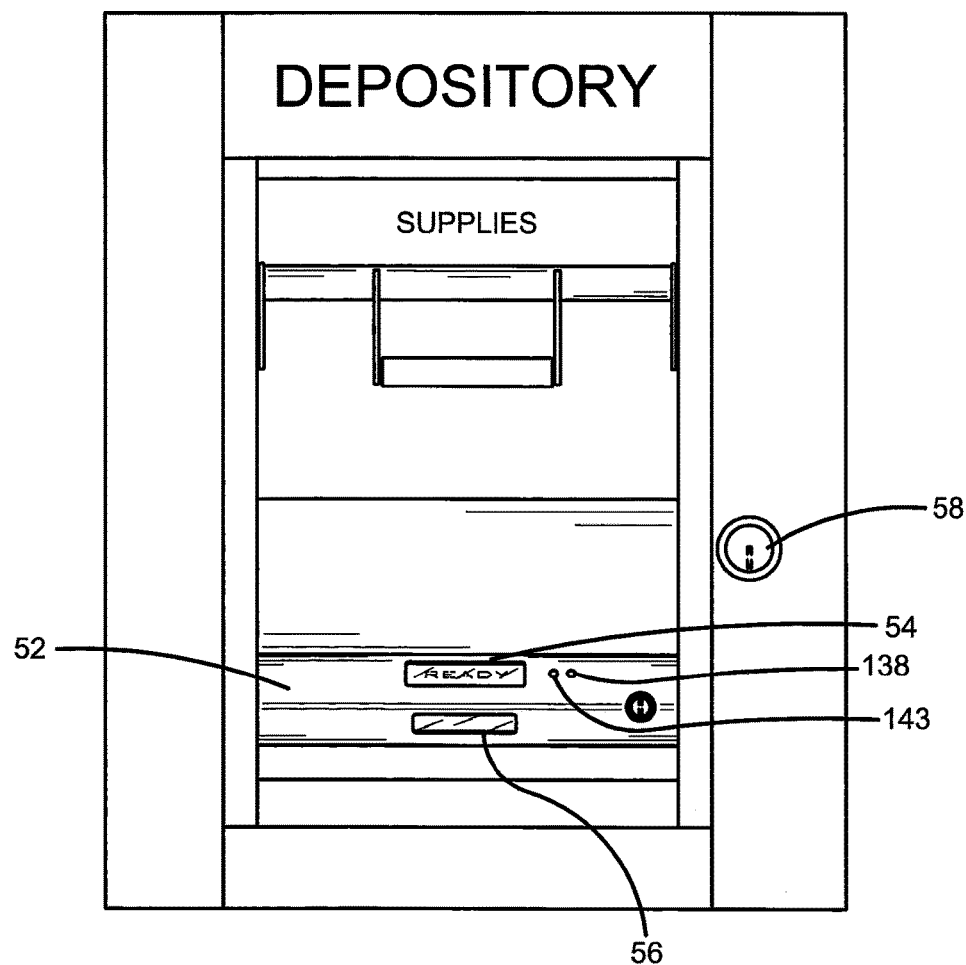
FIG. 14 is a plan view of an alternative exemplary depository arrangement including a manual actuator for controlling the reading of appearance features on deposit items.

In other exemplary embodiments, the depository may include other types of devices to facilitate the operation thereof under varying circumstances. For example in some exemplary embodiments the control panel may include additional types of output and input devices through which users may provide information or instructions to the machine. In some exemplary arrangements the control panel may include a guidance signal output device 143 as represented in FIG. 14. Such a guidance signal output device may operate to provide signals from which audible instructions corresponding to the visible instructions output through the display 54 can be perceived by a user. Such signals which produce audible instructions may be used to provide a user with limited eyesight or who is blind, with instructions on how to operate the depository. Programming associated with the controller and the data store may operate to provide the user with such instructions. The guidance signal output device in some arrangements may include a headphone jack or similar structure which can be releasibly connected to headphones or a similar audio output device. In other arrangements, the output device may include a wireless output device which is suitable for communicating with wireless headphones or a mobile device associated with the user. Of course these approaches are exemplary and other approaches may be used in other arrangements.

In exemplary embodiments the controller may operate to sense operative connection between the guidance signal output device and a device that can provide audible instructions. This may be done, for example, through an interface that detects the headphone connector being inserted into a headphone jack. Alternatively when the guidance signal output device is a wireless device, the controller may sense signals seeking to establish communication therewith. In response to sensing such signals, the controller may operate in accordance with its programming to provide the user with instructions on how to provide inputs to the machine on how to vary functions such as output volume, the intensity of the display or other output parameters associated with the instructions that are provided to the user. Alternatively or in addition, the user may be provided with information about the typography of the depository as well as how to scan a deposit item. The instructions may in some arrangements be operative to instruct the user on each step or action that needs to be taken in order to have the depository read the appearance feature on the deposit item and to open the depository to place the deposit item within the depository. In still other arrangements where the control panel provides the user with a printed or electronic receipt, the instructions may include actions that the user may take in order to receive the receipt in the desired manner. Of course these approaches are exemplary and in other arrangements, other approaches may be used.

In still other exemplary arrangements, the control panel or other aspects of the depository may include other types of input and output devices. For example, additional identification factors may be received in order to authenticate the authorized user or their account for purposes of enabling the depository to be operated. For example, the control panel may include a card reader or token reader which operates to read account and/or user identifying data from a user card. The data read may be usable to authenticate the identity of the user. In other arrangements, a wireless interface may be provided to read data from a card, token, mobile device or similar article which can be utilized to authenticate the user. In still other arrangements, manual input devices such as touch screens or keypads can be provided in order to receive personal identification numbers, biometric inputs or other inputs that may be utilized in connection with authenticating the person seeking to operate the depository. Numerous and different approaches may be taken depending on the desires of the depository operator and the security needs associated with accepting deposit items.

In still other arrangements the programming associated with the controller may be operative to enable depository operation in the event that communication with the remote server is temporarily interrupted. This might occur due to the loss of a network connection or other issues that cause the depository to no longer be capable of continuous communication. In such exemplary arrangements, the programming associated with the controller may include the capability for determining if the deposit identifying data presented has an appropriate format for receipt by the machine. Such programming may determine if the deposit identifying data is consistent with that which the machine would be capable of accepting in circumstances where the depository is online to the at least one remote server. In response to determining that the appearance features on a scanned deposit item correspond to the correct format which the machine would accept, the controller may operate in accordance with its programming to record the appearance data and operate the depository to enable the deposit to be accepted. The machine may operate in accordance with its programming to confirm the receipt of the deposit. Later when communication is established with the remote server, the controller operates to send the information about deposits that were received while the depository was unable to communicate. In the event that a deposit has been erroneously accepted, the remote computer 16 may provide an appropriate communication to the financial institution or other entity responsible for the deposit to investigate the discrepancy when the deposit item is retrieved.

In still other arrangements, the controller of the depository may operate in a different manner when it is unable to communicate with the remote server. In such circumstances the depository may operate to request that the user provide additional information that can be used to authenticate the identity of the user at a later time. This may include, for example, the controller operating to request that the user scan a card associated with the account to which the deposit will be made through a card reading device on the depository. Alternatively or in addition, the user may be asked to provide a manual or electronic input. Such an input could be a PIN or similar manual or biometric input through a keypad or reading device on the depository. Alternatively, the user may be instructed to utilize a mobile device to contact an online portal that is accessible wirelessly and obtain deposit identifying data from the portal. The portal may operate in conjunction with the remote server 16 or other computer to provide unique deposit identifying data that a user may provide to the depository at the time of the deposit. This may include, for example, numerical values, alphanumerical values, or values, images or other indicia that can be output through a screen of a mobile device. In the case of visible indicia that can be output through the mobile device, the image sensor may be operated to capture the deposit identifying data. In alternative arrangements, alphanumerical values may be captured via a keypad or an audible signal sensing device of the depository. In this exemplary arrangement, the controller may associate the provided identifier while the user is at the machine with the deposit item. When the machine is able to communicate with the remote server, the remote server may then authenticate the information that was provided at the depository as well. Of course it should be understood that these approaches are exemplary.

In still other exemplary arrangements, the user may operate a mobile device to capture an image of the deposit identifying data while they are at the machine and send the deposit identifying data to a remote portal associated with the remote server 16. The remote server may then identify the appearance feature as associated with a pre-registered deposit. The user may then be requested to provide a further input which establishes that the user is at the machine. This may include, for example, the mobile device providing a bar code, numerical value or other item that is provided at the machine. This may include imaging with the mobile device a sticker or poster attached to the machine. Alternatively, it may include a visible output provided through the display on the panel. The user operating their mobile device may capture an image of the output value, or may input such a value manually, and send it to the online portal. Upon receiving the data which corresponds to the deposit item and data which shows that the user is at the depository, the remote server may operate to determine that the user is present at the depository and is in possession of the authorized deposit item. In response to making the determination, the at least one server may send one or more messages to the mobile device which provides the user of the mobile device with an appropriate output code or similar value. The programming associated with the controller at the depository may operate to receive this value and cause the depository to be opened in response thereto. For example, in some exemplary arrangement the received value may be a two-dimensional bar code that is output on the display of the user's mobile device. Receipt of the data corresponding to this value through the image sensor may be analyzed through operation of the controller and may correspond to stored values or other parameters that cause the depository to enable the drum to be unlocked. Such values may be encrypted or correspond to time sensitive values that will only work during particular periods. In this way, the depository can be operated under circumstances where its connection to the remote server has been lost. Alternatively, such approaches may provide an alternative manner to receive deposits even when communication with the remote server is available.

Further in some exemplary arrangements the depository may include data in the data store of the controller on deposits and appearance features associated with deposit items that have been already accepted. In this way, attempts by persons to reuse the same appearance feature on multiple deposit items can be detected and the depository may operate to decline to accept such items. Of course these approaches are exemplary.

In some exemplary embodiments the controller may operate to periodically send and receive messages from the at least one remote server to assure that the depository remains in communication with the remote server. A failure in such communications may indicate that the depository and the server have lost communication. In response to such determination, the server may operate to attempt to recover communications. The depository may operate in accordance with its programming to go into an offline operation mode of the types described. Further in exemplary arrangements, the at least one controller may operate to provide information concerning deposits received, the times of such deposits, the status of operating components of the depository and other information to local or remote computers for purposes of assuring proper operation of the depository. The at least one controller may be operative to provide such information locally such as to a servicer who is dispatched to assure that the depository is operating properly. Alternatively or in addition, the at least one controller may operate to provide information concerning the deposit items received, the timing thereof and other applicable information to the persons who open the safe and remove such deposits. This may be done, for example, by the controller receiving appropriate inputs to provide this data. Such data may be provided through a connector 134 to a local computer device so that the information can be transported with the deposit items. Of course appropriate provisions are made by the programming associated with the controller such that only authorized persons are able to recover this data. Further in exemplary arrangements, the depository may include sensing devices to determine if the safe door has been opened. In such arrangements, alarms may be given remotely through operation of the controller and/or local alarms may be sounded if the safe door is open without the controller first receiving appropriate authentication data which corresponds to someone authorized to remove the deposit items from the safe. Of course these approaches are exemplary and in other embodiments other approaches may be used.

In still other exemplary arrangements, the depository may operate to accept deposits that have not been preregistered but which include information that can be used to derive the account number associated with the depositing entity as well as the content and/or value of the deposit item. In such exemplary systems the account holder who may wish to make a deposit into the depository may have a software application on their PC that enables the generation of deposit identifying data. Alternatively in other arrangements users wishing to make a deposit may access a web-based portal that enables the generation of deposit identifying data. In each case the computer generating the deposit identifying data does not have the capability to preregister the deposit in the system, but is capable of causing the generation of values which can be used to produce visible indicia which can be used by a user to apply to a deposit item and to deposit that item in a depository.

In this alternative exemplary arrangement, a local or remote computer which generates the deposit identifying data, receives or has stored therein data which corresponds to a user's financial account. In some exemplary arrangements this account data may be received by the computer through manual inputs by a user through a keyboard or other similar input device. In other arrangements, account data may be received by a magnetic card reader reading magnetic data from a card. Alternatively in other arrangements the account data may be received wirelessly from a card, mobile device or other device from which account identifying data can be obtained.

In this alternative exemplary arrangement, the programming of the computer utilized by the user wishing to make a deposit is further operative to receive from the user, information concerning the content associated with the deposit item. Such content information may include information on what items are included as part of the deposit. Information such as the number and denomination of currency bills, the number and values of checks, the number and value of vouchers, values of credit card receipts or similar items included with the deposit may be input by a user in response to prompts that are provided by the local or web-based computer program. Of course it should be understood that these input values are exemplary and in other arrangements, additional information, less information or other types of information may also be included.

In this exemplary arrangement after the user has finished inputting deposit content information, the user then provides one or more inputs. This causes the computer to generate data which corresponds to at least one appearance feature that can be attached to or correlated with the user's deposit item. In some exemplary arrangements the generated data may correspond to a two-dimensional bar code such as a QR code. In other exemplary arrangements, the generated data may correspond to other visual indicia which is suitable for reading by the image sensor. In the exemplary arrangement, the computer is operative to include in the generated data, data corresponding to visual indicia which can be read and identified by a controller associated with the depository as corresponding to an authorized deposit. This may include, for example, certain values, images, sequences, keys, formats or other items that can be included in invisible indicia and recognized through operation of the controller as corresponding to at least one appearance feature on the deposit item that corresponds to a deposit that the depository is configured to accept.

Further in the exemplary arrangement, the exemplary computer operates in accordance with its programming to include in the generated data, data which corresponds to an encrypted version of the account number data and/or deposit content data. Such encrypted data may include data which corresponds to the account number and/or deposit content information that is encrypted using one or more symmetric or asymmetric keys. This encrypted data is represented in the appearance feature such as by including visual indicia corresponding thereto in the two-dimensional bar code or other at least one appearance feature. This encrypted data can then be utilized through operation of the user's computer to print or otherwise produce the at least one appearance feature that can be applied to the deposit item. This may be, for example, a two-dimensional bar code that is printed and included in the deposit bag adjacent the transparent side wall such that the two-dimensional bar code can be read through operation of the image sensor on the depository. Alternatively in other arrangements, other types of visible indicia may be produced which corresponds to the at least one appearance feature that is applied to or associated with the deposit item.

In this exemplary alternative system, the user who has applied the visible indica to the deposit item may then take the deposit item to the depository. The depository may operate in a manner similar to that previously discussed to identify the appearance feature on the deposit item in a position where one or more images thereof are captured by the image sensor. In this exemplary arrangement, the controller associated with the depository operates in accordance with its programming to analyze the image data and determine if the image data includes all of the different values, features and parameters that are required to identify the at least one appearance feature as associated with a deposit item that can be accepted by the depository. In this exemplary alternative arrangement the controller does not attempt to determine if the deposit has been preregistered, but rather only verifies that all of the appropriate values or other information that is required to have an acceptable deposit is present within the visible indicia associated with the deposit item.

In response to determining that the visible indicia associated with the at least one appearance feature on the deposit item corresponds to a deposit item that the depository will accept, the controller of the depository operates to enable the user to place the deposit item into the depository. The controller operates in a manner like that previously discussed to unlock the depository and verify that the deposit item has been received into the depository. Of course as can be appreciated, the programming of the controller in exemplary embodiments may also include features like those previously discussed to identify situations where the deposit item is not received or other conditions that arise that may correspond to a problem with the operation of the depository or attempts to compromise the security of the depository.

In the exemplary embodiment the controller of the depository operates in accordance with its programming to store the encrypted data included with the visible indicia read from the deposit item. In the exemplary arrangement this encrypted data corresponds to the account number associated with the user making the deposit, the content of the deposited item and perhaps other additional data which may be pertinent to the deposit. In some exemplary arrangements the controller of the depository may have previously stored in an associated data store, the keys or other values that are usable to resolve from the encrypted data, the account number data and the content data associated with the deposit. In such arrangements, the controller may operate to make this data available locally to authorized individuals who may remove the deposit from the machine. Alternatively or in addition, the controller may operate to cause such data to be sent to one or more remote systems associated with the entity operating the depository. Of course it should be understood that communication of account number data and other data may be suitably encrypted during such transmission to a remote computer. The transmission of this data to a remote computer may enable the financial institution or other entity operating the depository to be advised that the particular deposit including the deposit items indicated, has been made to the identified account at a particular depository. In this way, the financial institution or other entity may issue a provisional credit or other notation in connection with the account of the user making the deposit.

In other arrangements, the controller of the exemplary depository may operate to send the encrypted data to a remote computer associated with the financial institution or other entity. The controller of the depository may not have the capability to resolve account number data and/or the content of the deposit item. In such cases the remote computer associated with the financial institution or other entity operating the depository includes the keys or other information necessary to resolve the account number and/or deposit item information. For example in such arrangements, the financial institution operating the depository may provide the public key of a public/private key pair, which is utilized by the computers which encrypt the account, content and other data concerning the user's deposit. The associated private key of the key pair is retained by the financial institution and is utilized by the computers of the institution to decrypt information which has been encrypted using the corresponding public key. In this way the financial institution's computers have the private key which can decrypt the information that has been encrypted using the corresponding public key. Thus the financial institution's computers that receive encrypted data from the depository can determine the account to which the deposit applies and the contents and value associated therewith. In this way the user's account can be credited with having made the deposit more quickly and depending on the policies of the institution, prior to the contents of the deposit item being verified through the manual inspection thereof.

Some exemplary embodiments of the depository may enable the acceptance of preregistered deposits as well as deposits that have not been preregistered. The depository may operate to accept the preregistered deposits based on checking the preregistration information at a remote server as previously described. Alternatively the depository may operate to accept all deposits based on the proper data being present in the visual indicia which comprises the at least one appearance feature on the deposit item. The controller included in the depository may operate in accordance with its programming to send messages which identify the preregistered deposits in the manner previously discussed. The controller may also operate to send to one or more remote computers the data concerning the deposits which have not been preregistered. Alternatively in some arrangements the deposit identifying data for preregistered deposits may differ in a predetermined way from the data included on deposits which have not been preregistered, but which nonetheless are authorized to be received by the depository. The controller associated with a depository may operate in accordance with its programming to check the preregistered status of those deposits which have identifying data which conforms to a preregistered deposit and may avoid checking with a remote server for those deposits with identifying data that conforms to a deposit which has not been preregistered. Further in some exemplary arrangements the controller may operate in accordance with its programming to store data associated with deposits which have not been preregistered for a period of time in one or more local data stores associated with the controller. Periodically the controller may operate in accordance with its programming to send data corresponding to a plurality of deposits which were made to the depository and which were not preregistered to one or more remote computers so as to inform the financial institution or other entity operating the depository of a plurality of deposits that were not preregistered and that were received in the depository. Of course numerous different approaches may be taken utilizing these principles for purposes of receiving and processing received deposits.

Thus the exemplary embodiments achieve improved operation, eliminate difficulties encountered in the use of prior devices and systems, and attain the useful results described herein.

In the foregoing description, certain terms have been used for brevity, clarity and understanding. However, no unnecessary limitations are to be implied therefrom because such terms are used for descriptive purposes and are intended to be broadly construed. Moreover the descriptions and illustrations herein are by way of examples and the invention is not limited to the features shown and described.

Further in the following claims any feature described as a means for performing a function shall be construed as encompassing any means known to those skilled in the art as being capable of carrying out the recited function and shall not be deemed limited to the particular means shown or described for performing the recited function in the foregoing description or mere equivalents thereof.

It should be understood that features and/or relationships associated with one embodiment can be combined with features and/or relationships from another embodiment. That is, various features and/or relationships from various embodiments can be combined in further embodiments. The inventive scope of the disclosure is not limited to only the embodiments shown or described herein.

The term "non-transitory" with regard to computer readable medium is intended to exclude only the subject matter of a transitory signal, per se, where the medium itself is transitory. The term "non-transitory" is not intended to exclude any other form of computer readable media, including but not limited to media comprising data that is only temporarily stored or stored in a transitory fashion. Should the law change to allow computer readable medium itself to be transitory signals, then this exclusion is no longer valid or binding.

Having described the features, discoveries and principles of the exemplary embodiments, the manner in which they are constructed and operated, and the advantages and useful results attained, the new and useful structures, devices, elements, arrangements, parts, combinations, systems, equipment, operations, methods, processes and relationships are set forth in the appended claims.

We claim:

1. A tangible medium including non-transitory processor executable instructions operative to cause an apparatus in operative connection with at least one processor executing such instructions to carry out a method comprising:
   a) operating at least one illumination device on a control panel external of an item accepting depository, to illuminate at a first illumination level,
   b) during at least a portion of (a), operating at least one image sensor on the control panel to detect item movement external of the depository and adjacent to the at least one image sensor,
   c) responsive at least in part to detecting item movement in (b), operating the at least one illumination device at a second illumination level higher than the first illumination level,
   d) during at least a portion of (c), capturing at least one image of at least one appearance feature associated with a deposit item positioned external of the depository, through operation of the at least one image sensor,
   e) generating appearance data which corresponds to the at least one appearance feature captured in (d),
   f) determining that the appearance data generated in (e) corresponds to a pre-registered financial deposit authorized to be accepted by the depository,
   g) responsive at least in part to the determination in (f), operating a lock associated with a depository head of the depository, to change from a locked condition to an unlocked condition, wherein in the unlocked condition the depository head is enabled to accept the deposit item into an interior area of the depository.

2. The medium according to claim 1, wherein the method further includes
   h) prior to (d), operating a target projector on the control panel to project a target marking, wherein the target marking is indicative of a location to position the at least one appearance feature on the deposit item to enable the at least one image sensor to capture the at least one image of the at least one appearance feature.

3. The medium according to claim 2,
   wherein in (h), the target projector operates to project the target marking responsive at least in part to the item movement detected in (b).

4. The medium according to claim 1
   wherein the depository head includes a pocket, and wherein when the lock is in an unlocked condition the pocket is enabled to be externally accessible on the depository such that the deposit item may be received therein,
   wherein the method further includes
      i) subsequent to (g), operating at least one inspection camera to produce at least one internal depository image including an image of at least a portion of the pocket,
      j) determining from the at least one internal depository image, that the deposit item received in the pocket includes the at least one appearance feature.

5. The medium according to claim 1
   wherein the depository head includes a pocket, and wherein when the lock is in an unlocked condition the pocket is enabled to be externally accessible on the depository such that the deposit item may be received therein,
   wherein the method further includes
      i) subsequent to (g), operating at least one inspection camera to produce at least one internal depository image including an image of at least a portion of the pocket,
      j) determining from the at least one internal depository image, that the deposit item was received in the pocket.

6. The medium according to claim 5
   wherein the depository head includes a rotatable drum, wherein the pocket is positioned in the rotatable drum, and
   wherein the depository further includes a safe, wherein the safe has a safe interior area positioned below the rotatable drum, wherein items in the pocket are enabled to fall into the safe interior area when the drum is moved so that the pocket is not externally accessible on the depository,
   the method further including:
      k) subsequent to (j), capturing at least one further internal depository image through operation of the at least one inspection camera after the depository drum has been moved to a position in which the deposit item is enabled to fall out of the pocket and into the safe interior area,
      l) determining from the at least one further internal depository image that the deposit item is no longer in the pocket.

7. The medium according to claim 5
   wherein the method further includes:
      k) operating the at least one image sensor to read visible program indicia from a program item, wherein the visible program indicia includes program instructions,
      l) changing the non-transitory processor executable instructions stored on the medium in response to the program instructions read in (k),
      m) subsequent to (l), operating the apparatus in accordance with the changed processor executable instructions.

8. The medium according to claim 7
   wherein in (l) the instructions are changed to prevent at least some subsequent changes responsive to visible program indicia read from further program items.

9. The medium according to claim 7
   wherein in (d) the at least one captured appearance feature includes at least one of
      a bar code,
      a visible feature on a currency bill,
      a visible feature on a financial check, and
      a display on a mobile wireless device.

10. The medium according to claim 9
    wherein the control panel further includes a display and a manual input device,
    wherein the method further includes
       n) determining that item movement has been repeatedly detected in (b) without an image of an appearance feature being captured in (d),
       o) responsive to the determination in (n), operating the display to provide an output indicating that the manual input device must be manually operated to capture at least one image of at least one appearance feature associated with a deposit item, p) subsequent to (o), operating the at least one illumination device at the second illumination level responsive at least in part to manual actuation of the manual input device.

11. The medium according to claim 10
wherein the method further includes
q) subsequent to (j), causing a financial account to be credited with an amount associated with the pre-registered financial deposit.

12. The medium according to claim 1
wherein in (d) the at least one captured appearance feature includes at least one of
a bar code,
a visible feature on a currency bill,
a visible feature on a financial check, and
a display on a mobile wireless device.

13. The medium according to claim 1
wherein the control panel further includes a display and a manual input device,
wherein the method further includes
h) determining that item movement has been repeatedly detected in (b) without an image of an appearance feature being captured in (d),
i) responsive to the determination in (h), operating the display to provide an output indicating that the manual input device must be manually operated to capture at least one image of at least one appearance feature associated with a deposit item,
j) subsequent to (i), operating the at least one illumination device at the second illumination level responsive at least in part to manual actuation of the manual input device.

14. The medium according to claim 1
wherein the method further includes
h) operating an internal inspection camera to capture at least one image of an area internal of the depository,
i) determining from the at least one image captured in (h) that the deposit item was received in the depository,
j) responsive to the determination in (i), causing a financial account to be credited with an amount associated with the pre-registered financial deposit.

15. A tangible medium including non-transitory processor executable instructions operative to cause an apparatus in operative connection with at least one processor executing such instructions to carry out a method comprising: a) operating a target projector on a control panel on an exterior of an item accepting depository, to project a target marking indicative of a location to position at least one appearance feature on a deposit item outside the depository so that the at least one appearance feature is readable by at least one image sensor of the control panel, b) during at least a portion of (a), capturing at least one image of at least one appearance feature associated with the deposit item through operation of the at least one image sensor, c) generating appearance data which corresponds to the at least one appearance feature captured in (b), d) determining that the appearance data generated in (c) corresponds to a pre-registered financial deposit authorized to be accepted by the depository, e) responsive at least in part to the determination in (d), operating a lock associated with a depository head of the depository, to change from a locked condition to an unlocked condition, wherein in the unlocked condition the depository head is enabled to accept the deposit item into an interior area of the depository.

16. The medium according to claim 15
wherein the method further includes
(f) prior to (a), operating the at least one image sensor to detect item movement in proximity to the control panel,
wherein the target marking is projected in (a) responsive at least in part to the detected item movement in (f).

17. The medium according to claim 16
wherein the control panel includes at least one illumination device,
wherein in (f) the at least one illumination device is operated to illuminate at a first illumination level, and
wherein responsive at least in part to the detection of item movement in (f), the at least one illumination device is operated at a second illumination level higher than the first illumination level,
wherein in (b) the at least one image is captured while the at least one illumination device is operated at the second illumination level.

18. The medium according to claim 15
wherein in (b) the at least one captured appearance feature includes at least one of
a bar code,
a visible feature on a currency bill,
a visible feature on a financial check, and
a display on a mobile wireless device.

19. A tangible medium including non-transitory processor executable instructions operative to cause an apparatus in operative connection with at least one processor executing such instructions to carry out a method comprising:
a) operating at least one image sensor on an external control panel of an item accepting depository to capture at least one image of at least one appearance feature associated with a deposit item positioned external of the depository,
b) generating appearance data which corresponds to the at least one appearance feature captured in (a),
c) determining that the appearance data generated in (b) corresponds to a pre-registered financial deposit authorized to be accepted by the depository,
d) responsive at least in part to the determination in (c), operating a lock associated with a depository head of the depository to change from a locked condition to an unlocked condition, wherein in the unlocked condition a pocket of the depository head is enabled to be accessible from outside the depository, wherein the pocket is configured to accept the deposit item therein,
e) subsequent to (d), operating at least one pocket inspection camera to capture at least one pocket inspection image including an image of at least a portion of the pocket,
f) subsequent to (e), determining that the deposit item was placed in the pocket responsive at least in part to the at least one pocket inspection image.

20. The medium according to claim 19
prior to (a)
operating at least one illumination device on the control panel at a first illumination level,
while the at least one illumination device is illuminated at the first illumination level,
detecting movement externally adjacent to the control panel with the at least one image sensor,
responsive at least in part to the detected movement, operating the at least one illumination device at a second illumination level that is higher than the first illumination level, wherein in (a), the at least one image of at least one appearance feature is captured while the at least one illumination device is operated at the second illumination level.

* * * * *